(12) United States Patent
Granitzer et al.

(10) Patent No.: US 12,029,285 B2
(45) Date of Patent: Jul. 9, 2024

(54) CLOSURE DEVICE THAT IS SECURED WHEN LOADED

(71) Applicant: Fidlock GmbH, Hannover (DE)

(72) Inventors: Christopher Granitzer, Mödling (AT); Artur Siebert, Hannover (DE); Breido Botkus, Hannover (DE)

(73) Assignee: Fidlock GmbH, Hannover (DE)

( * ) Notice: Subject to any disclaimer, the term of this patent is extended or adjusted under 35 U.S.C. 154(b) by 26 days.

(21) Appl. No.: 18/008,726

(22) PCT Filed: Jun. 7, 2021

(86) PCT No.: PCT/EP2021/065151
§ 371 (c)(1),
(2) Date: Dec. 7, 2022

(87) PCT Pub. No.: WO2021/249933
PCT Pub. Date: Dec. 16, 2021

(65) Prior Publication Data
US 2023/0210224 A1    Jul. 6, 2023

(30) Foreign Application Priority Data

Jun. 11, 2020 (DE) ..................... 10 2020 207 310.4

(51) Int. Cl.
*A44B 11/25* (2006.01)
*A44B 11/26* (2006.01)
(Continued)

(52) U.S. Cl.
CPC ........ *A44B 11/2592* (2013.01); *A44B 11/258* (2013.01); *A44B 11/263* (2013.01);
(Continued)

(58) Field of Classification Search
CPC . A44B 11/2592; A44B 11/258; A44B 11/263; A44B 11/266; F16M 13/022; A45F 5/021
(Continued)

(56) References Cited

U.S. PATENT DOCUMENTS 9,677,581 B2 * 6/2017 Tucholke ........... A44B 11/2584
11,835,081 B2 * 12/2023 Bleckat ................... F16B 47/00
(Continued)

FOREIGN PATENT DOCUMENTS

DE 102017212152 A1 1/2019
EP 3093525 A1 11/2016
(Continued)

*Primary Examiner* — Todd M Epps
(74) *Attorney, Agent, or Firm* — The Webb Law Firm

(57) ABSTRACT

Provided is a closure device including a first closure part that includes a locking element, a force transmission element operatively connected to the locking element, which can be loaded along a force direction, and an actuating element movable relative to the locking element, and a second closure part that includes an engagement element. The locking element and the engagement element can be attached to each other for connecting the first closure part and the second closure part to each other and are connected to each other in a closed position. In the closed position, when the force transmission element is loaded along the force direction, the locking element is loaded in a locking direction towards contact with the engagement element by the action of force of the force transmission element. The actuating element can be actuated in order to adjust the locking element against the locking direction.

16 Claims, 22 Drawing Sheets

(51) Int. Cl.
*A45F 5/02* (2006.01)
*F16B 1/00* (2006.01)
*F16M 13/02* (2006.01)
*A45F 5/00* (2006.01)
*F16M 13/04* (2006.01)

(52) U.S. Cl.
CPC ............ *A44B 11/266* (2013.01); *A45F 5/021* (2013.01); *F16B 1/00* (2013.01); *F16M 13/022* (2013.01); *A44D 2203/00* (2013.01); *A45F 2005/006* (2013.01); *A45F 2005/008* (2013.01); *A45F 2200/0575* (2013.01); *F16B 2200/83* (2023.08); *F16M 13/04* (2013.01); *F16M 2200/00* (2013.01)

(58) Field of Classification Search
USPC ........................................................ 248/636
See application file for complete search history.

(56) References Cited

U.S. PATENT DOCUMENTS

| 11,889,901 B2 * | 2/2024 | Büttner | .................... F16B 21/16 |
| 2012/0216373 A1 | 8/2012 | Fiedler | |
| 2012/0227220 A1 | 9/2012 | Fiedler | |

FOREIGN PATENT DOCUMENTS

| EP | 2475278 B1 | 4/2017 |
| EP | 2475279 B1 | 5/2017 |
| EP | 3494826 A1 | 6/2019 |

* cited by examiner

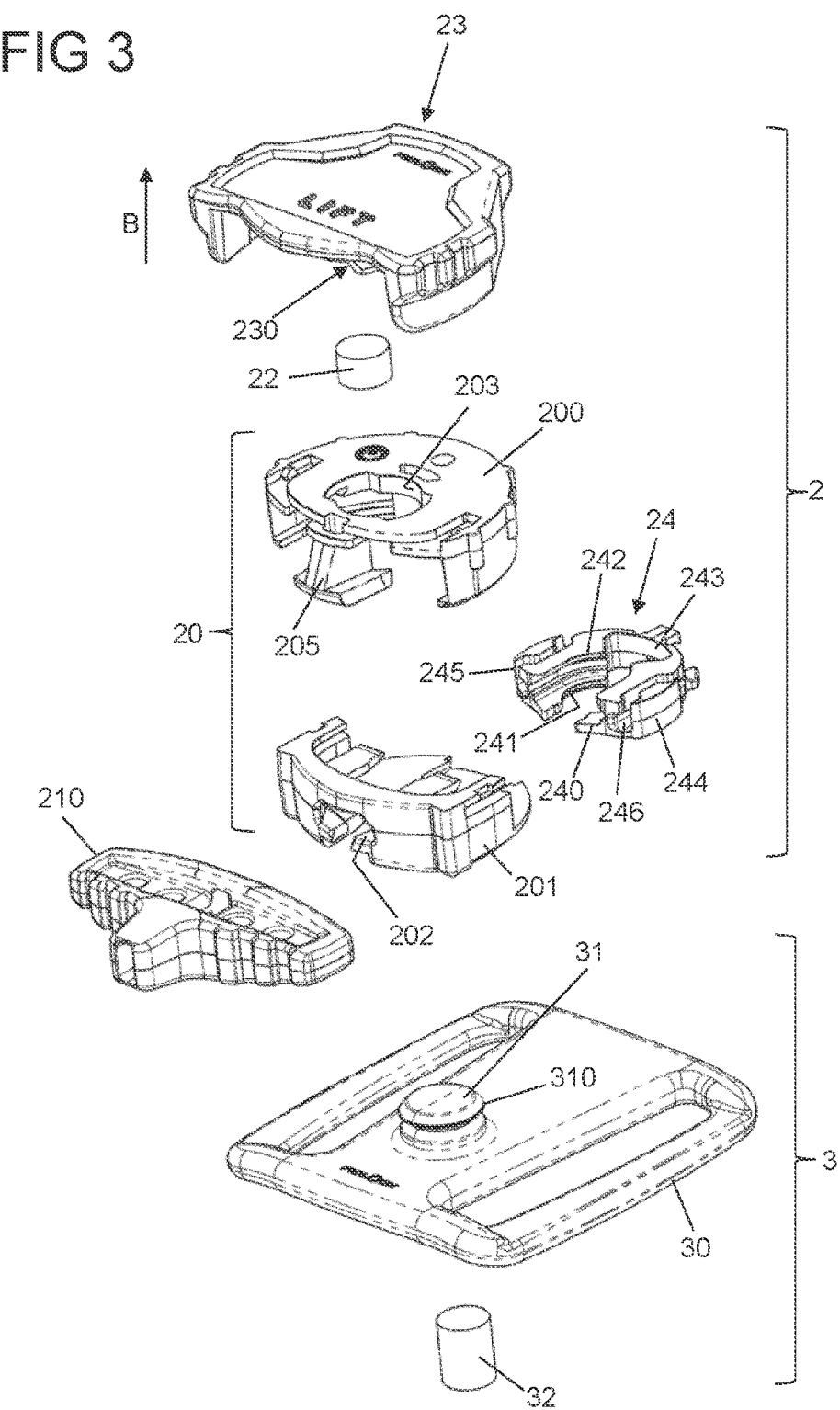

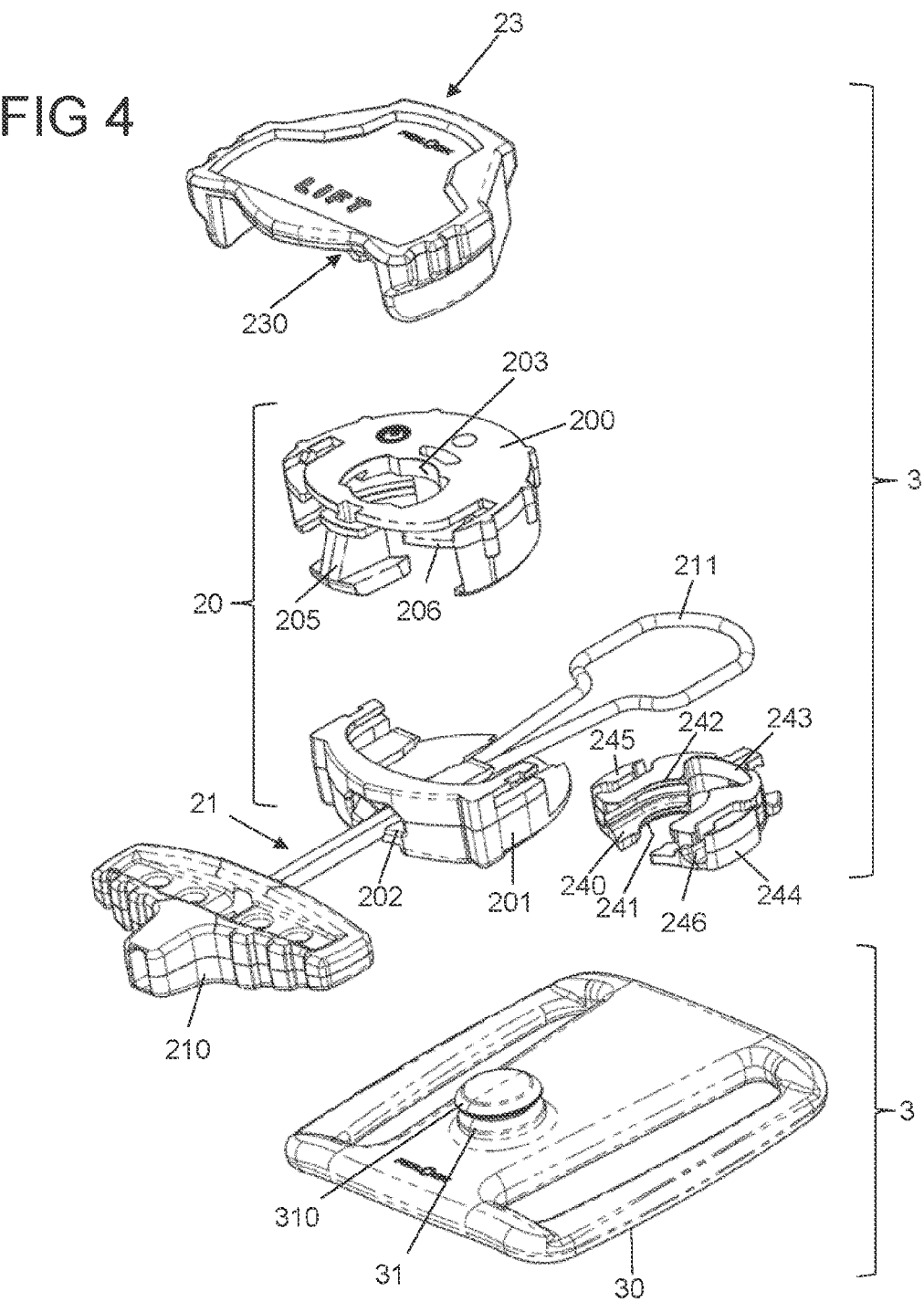

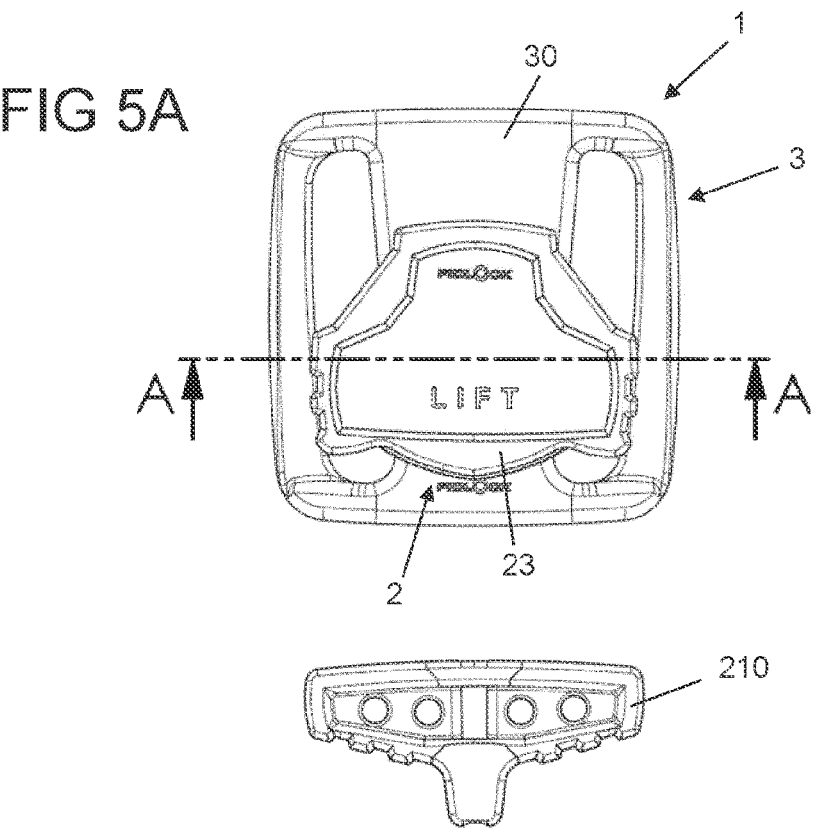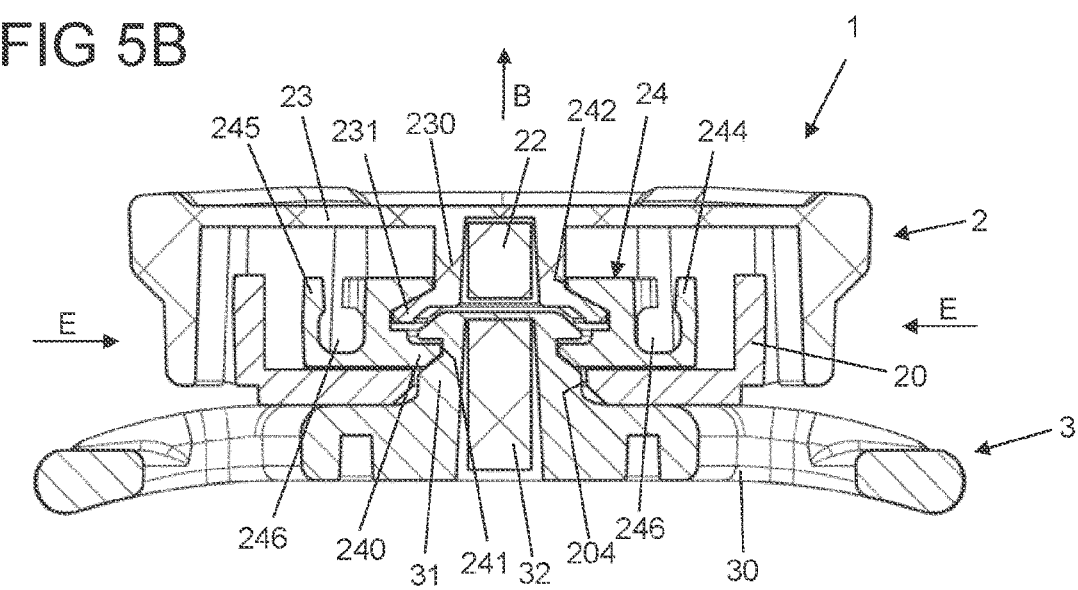

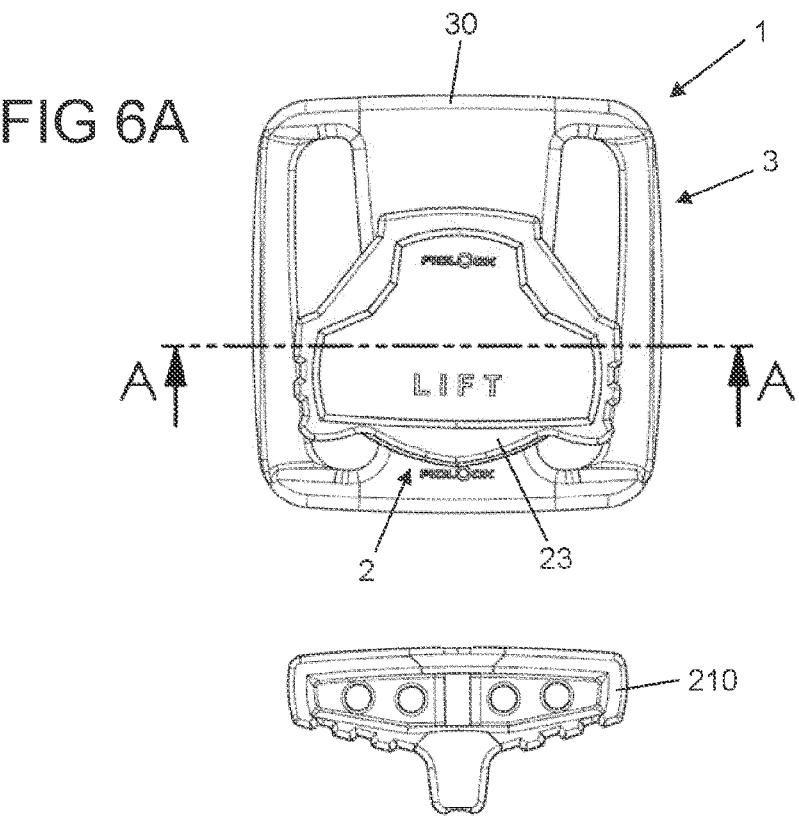
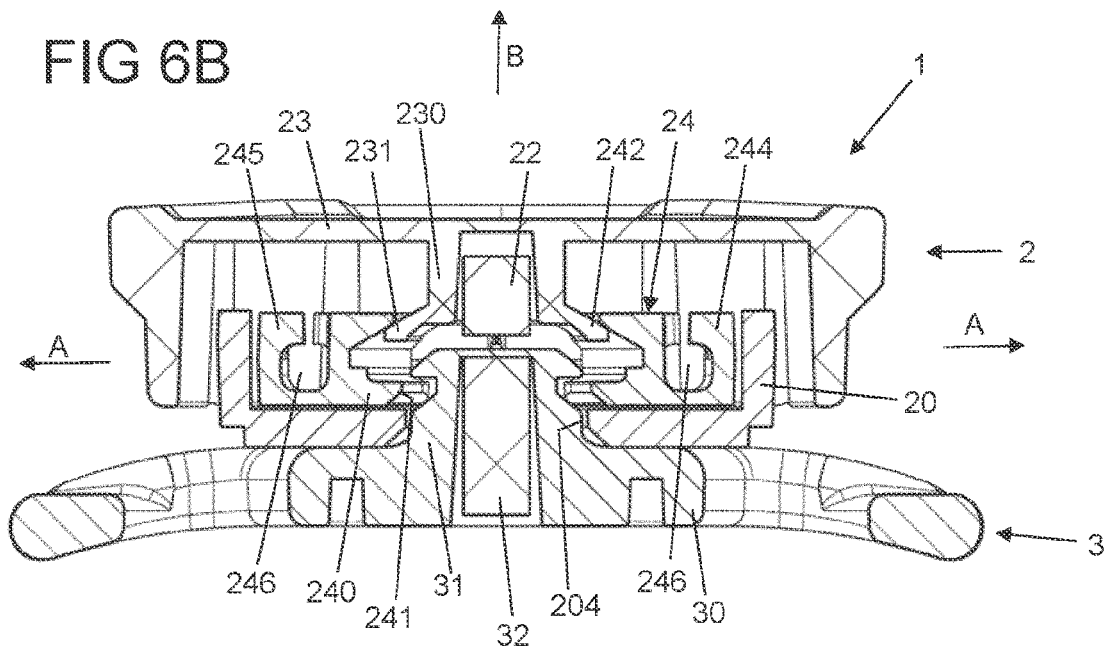

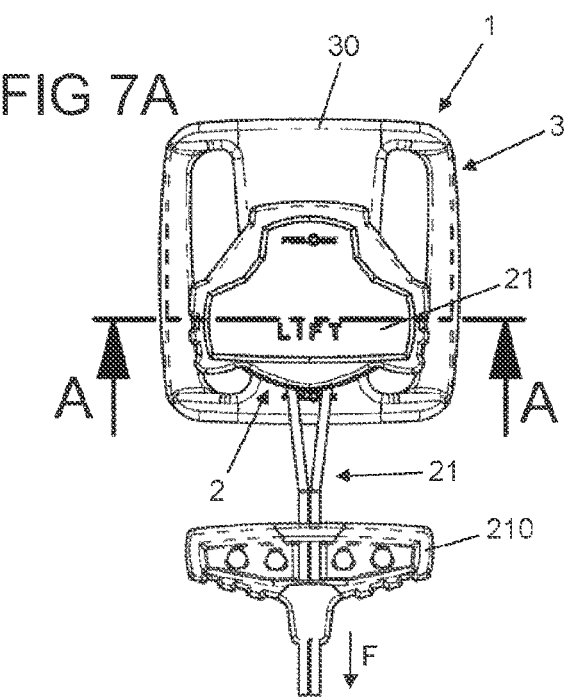
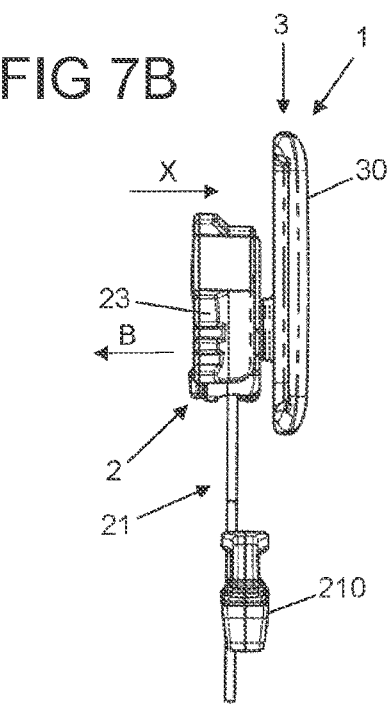
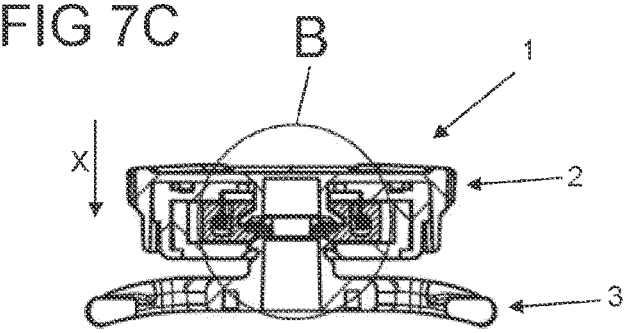
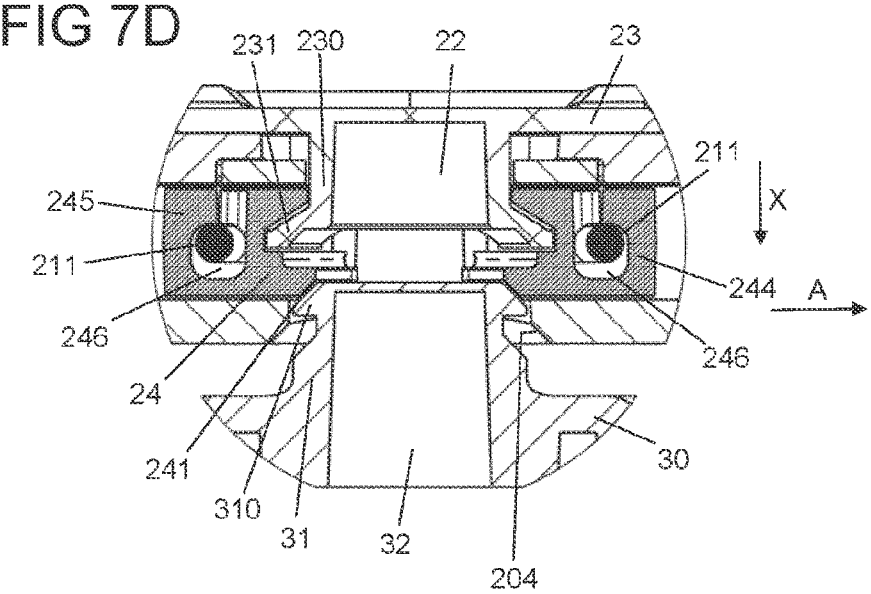

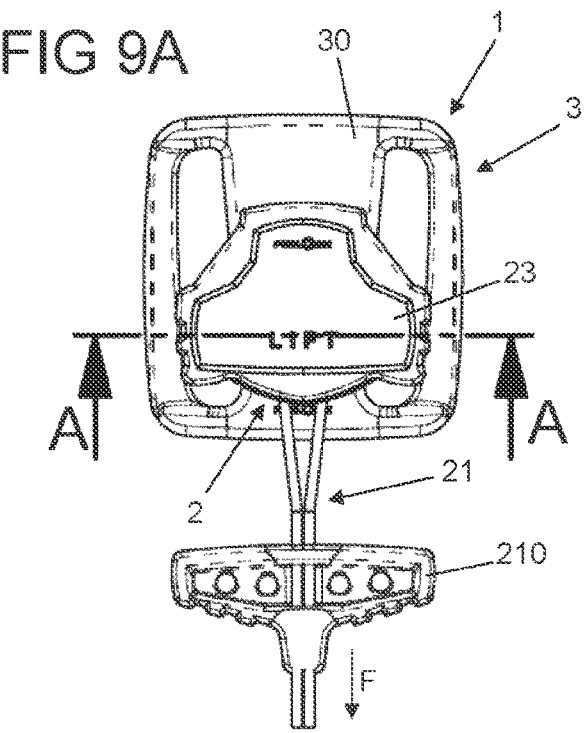
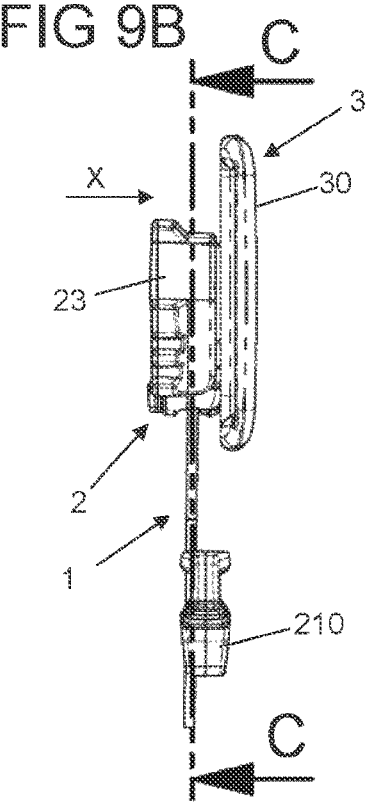
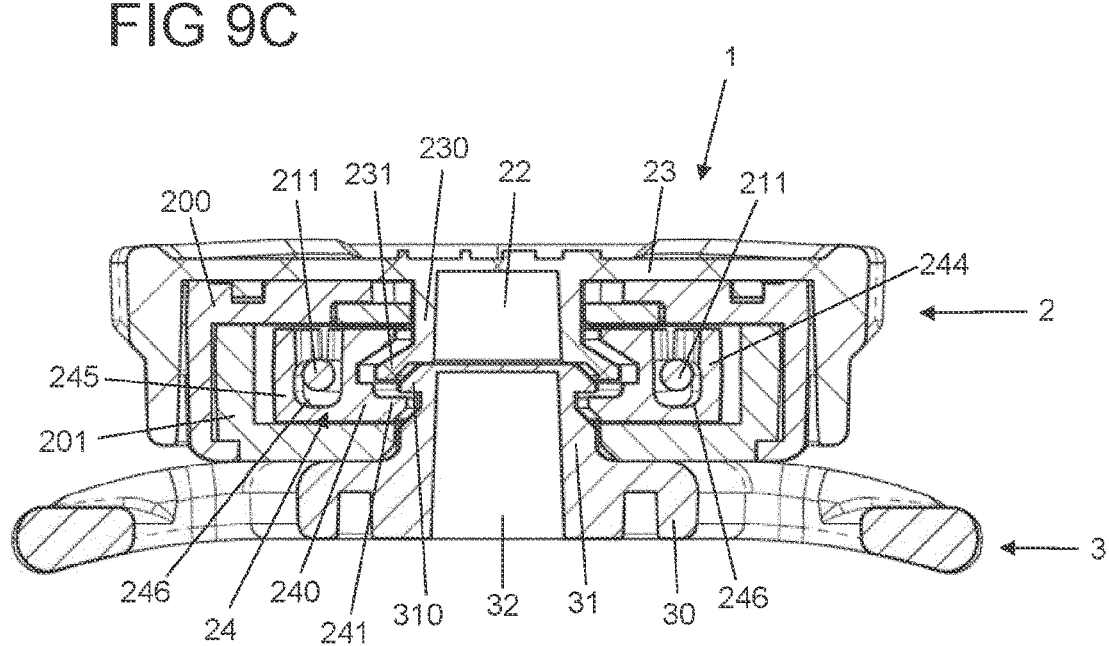

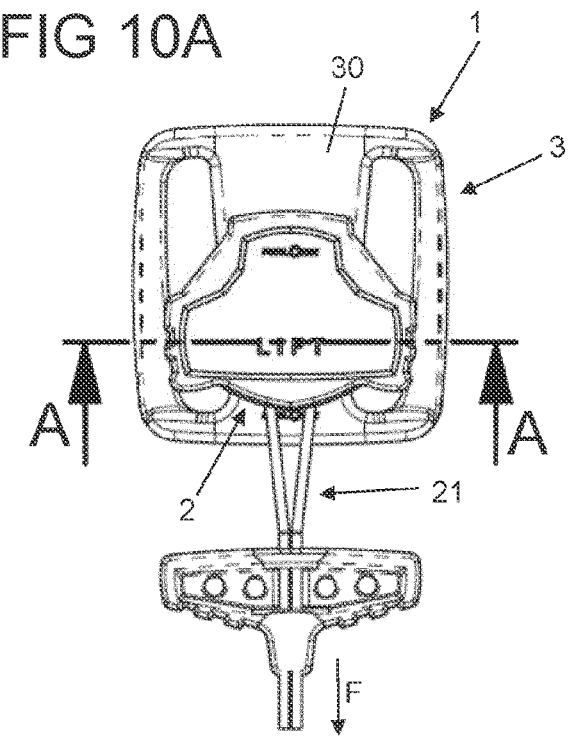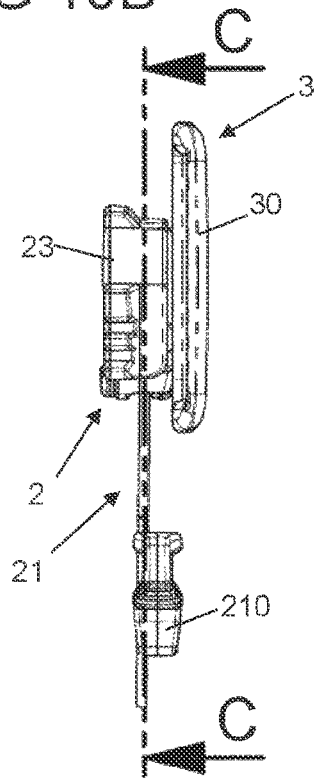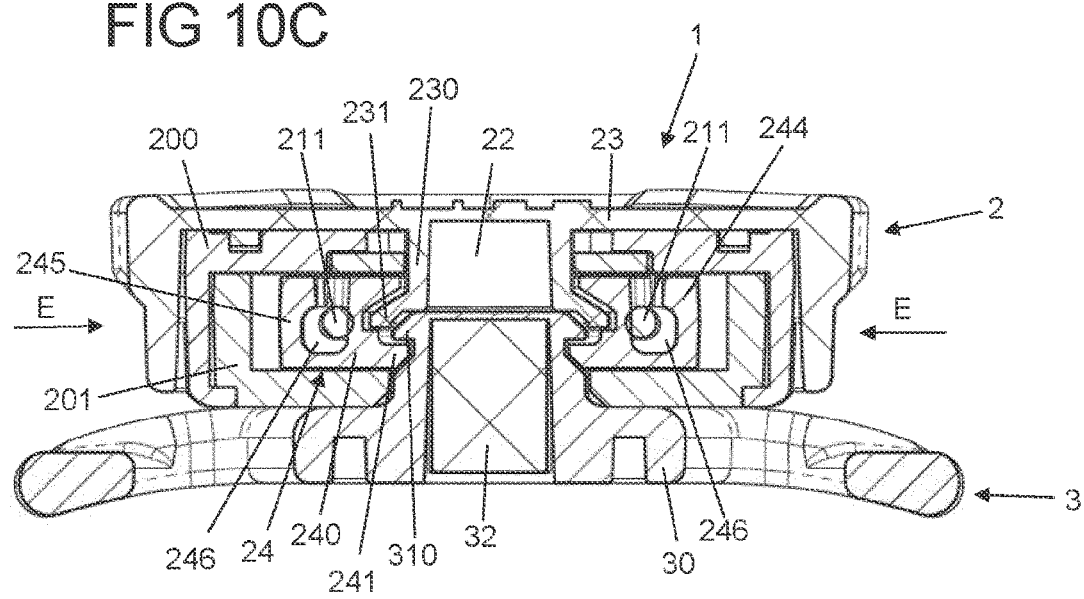

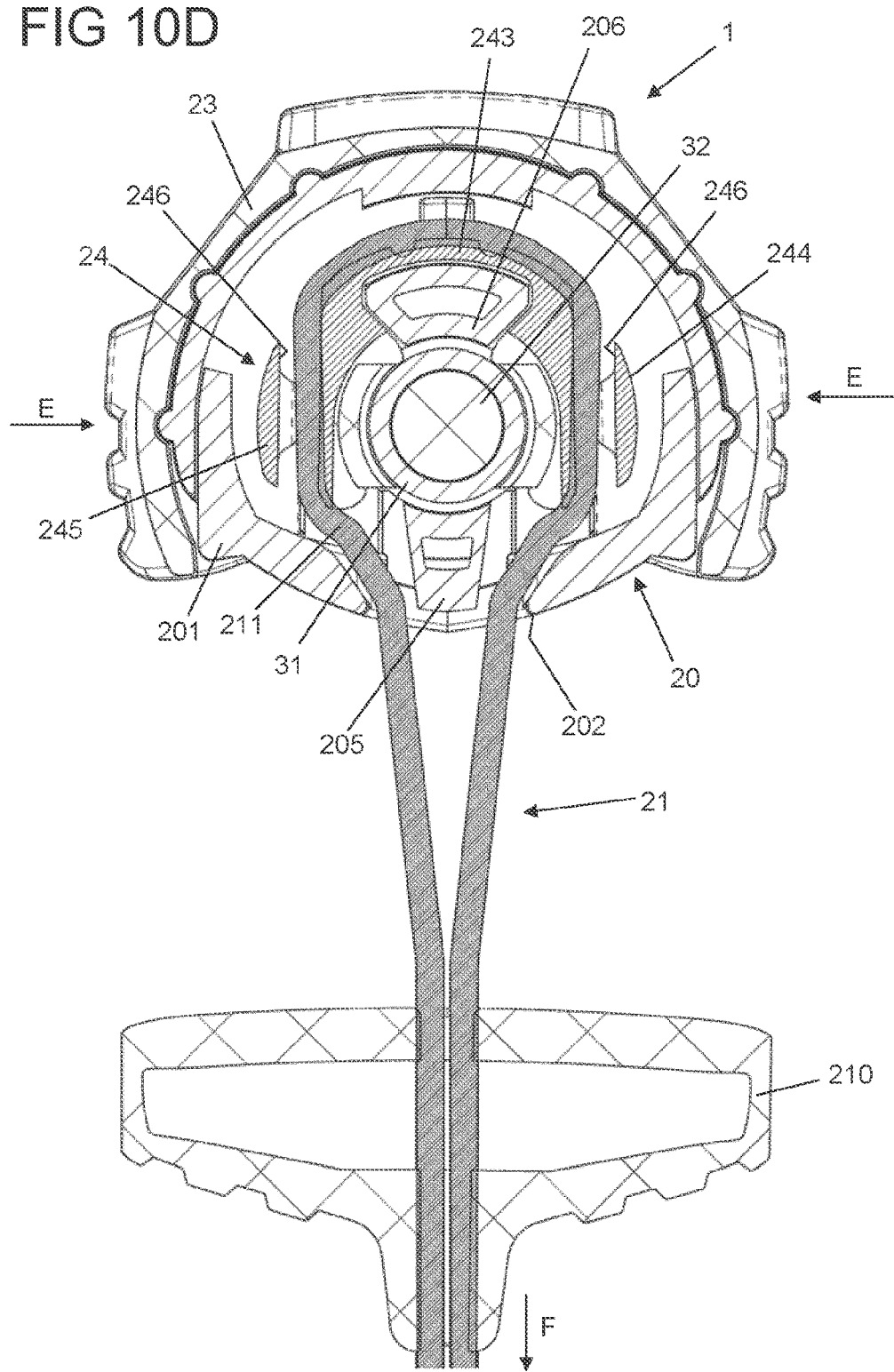

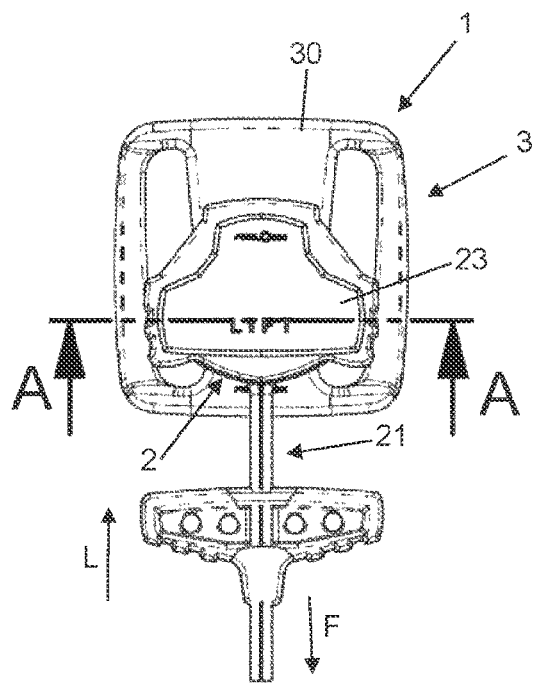
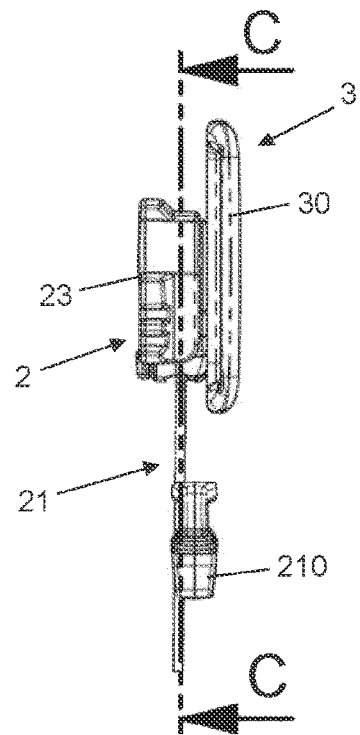
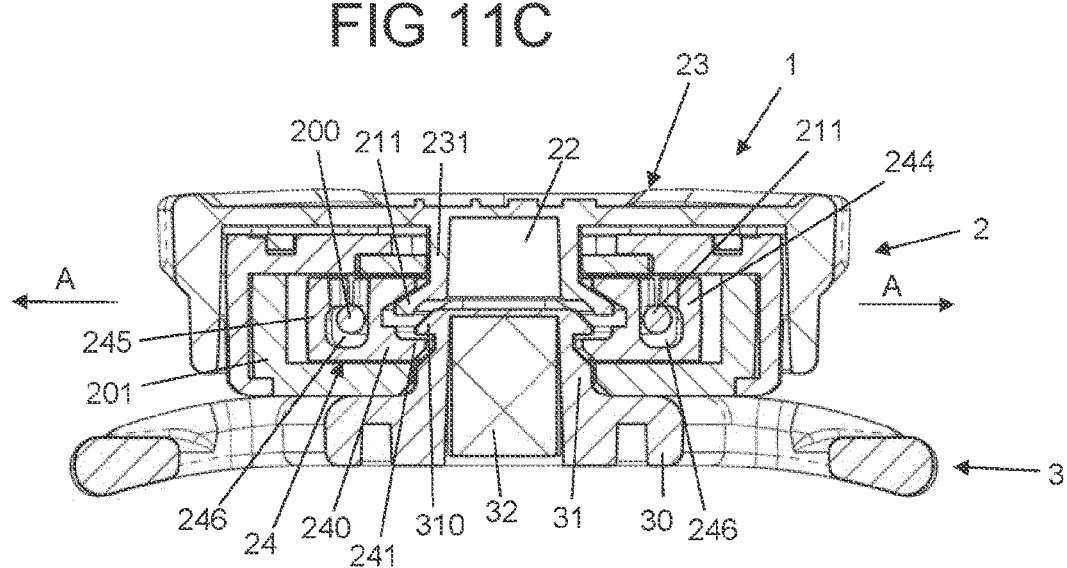

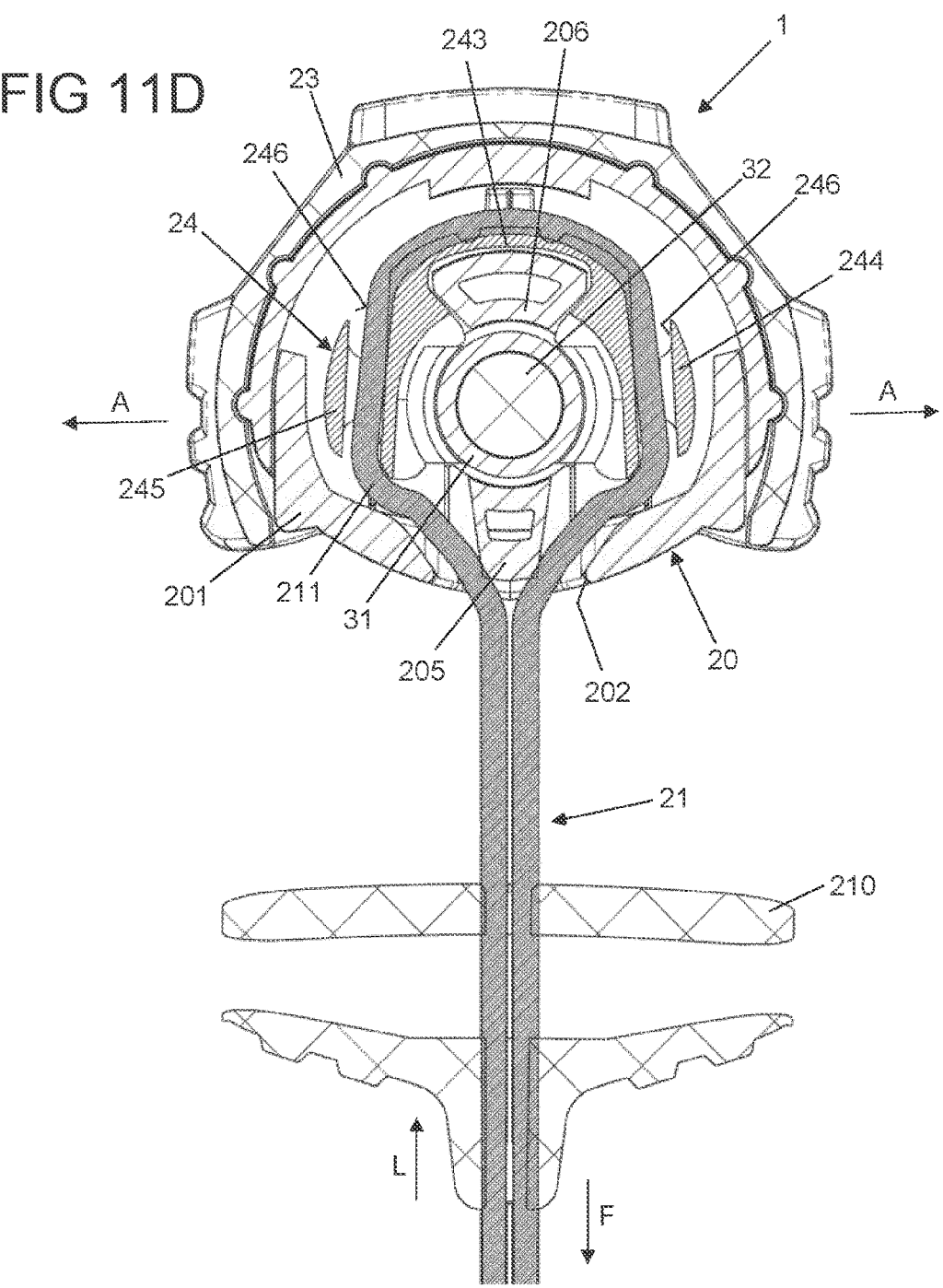

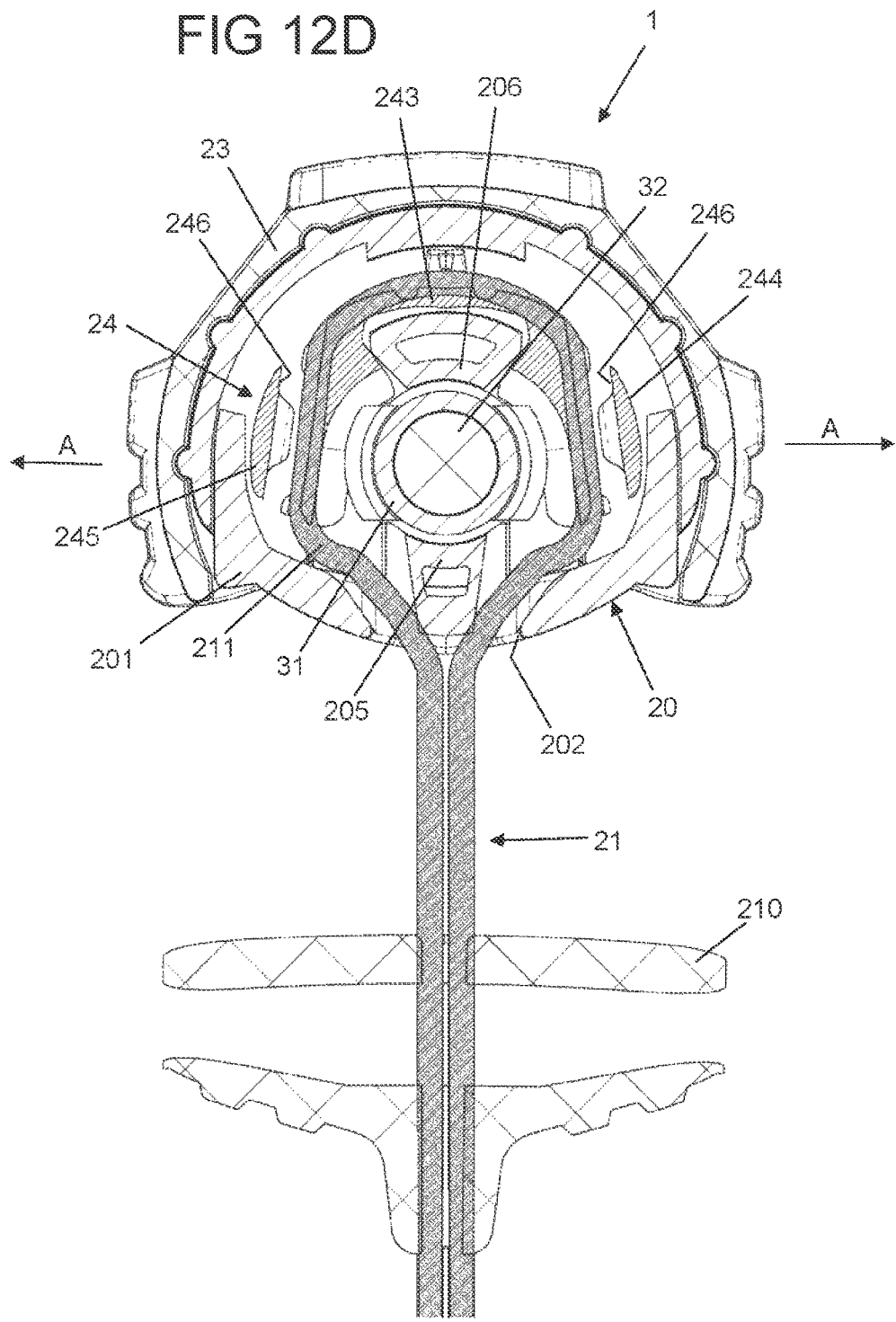

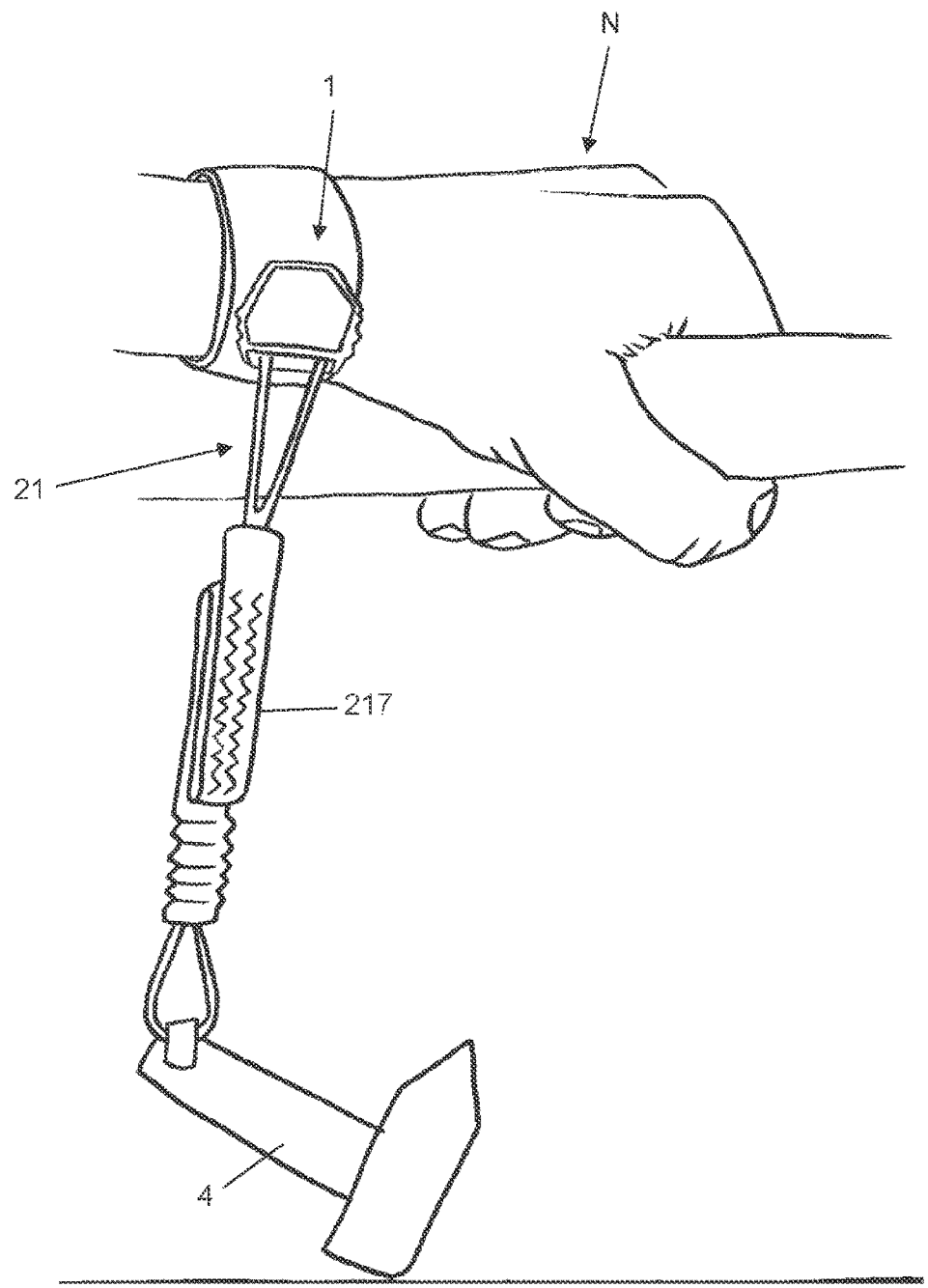

CLOSURE DEVICE THAT IS SECURED WHEN LOADED

CROSS-REFERENCE TO RELATED APPLICATIONS

This application is the United States national phase of Patent International Application Number PCT/EP2021/065151, filed Jun. 7, 2021, and claims priority to German Patent Application Number 10 2020 207 310.4, filed Jun. 11, 2020, the disclosures of which are hereby incorporated by reference in their entireties.

BACKGROUND OF THE INVENTION

Field of the Invention

This disclosure relates to a closure device.

Description of Related Art

Such a closure device serves for connecting two assemblies to each other. Such a closure device for example can serve for mounting an object, for example a tool, on a superordinate assembly, for example a carrying device, a belt or band, a ladder, a vehicle, a scaffold or the like.

Such a closure device includes a first closure part that includes a locking element, a force transmission element operatively connected to the locking element, which can be loaded along a force direction, and an actuating element movable relative to the locking element. The closure device also comprises a second closure part that includes an engagement element. The locking element and the engagement element can be attached to each other for connecting the first closure part and the second closure part to each other and are connected to each other in a closed position. In the closed position, when the force transmission element is loaded along the force direction, the locking element is loaded in a locking direction towards contact with the engagement element by the action of force of the force transmission element. The actuating element can be actuated in order to adjust the locking element against the locking direction for releasing the connection between the locking element and the engagement element.

Such a closure device can create a particularly firm connection due to the fact that by the action of force the locking element is secured on the force transmission element in its connection with the engagement element, since the force transmission element loads the locking element towards contact with the engagement element. The connection between the closure parts can be released by actuating the actuating element in order to thereby cause an adjustment of the locking element against the locking direction and thus out of contact with the engagement element.

From EP 3 093 525 B1, a device for holding a loop formed in an elongated element is known, which includes a base part, a carrier ring and jaws shiftable radially with respect to the carrier ring. At least one elastic element loads the jaws radially inwardly, wherein, when the loop rests against radially outer ends of the jaws, the jaws positively engage into the base part in a position shifted towards the inside. An extractor is axially adjustable with respect to the base part and the carrier ring in order to press the jaws radially towards the outside and eliminate their positive engagement into the base part.

From EP 2 475 278 B1, a closure device with two closure parts is known, in which in a closed stated under load the two closure parts are held at each other frictionally by adhesive friction or latchingly by a latching connection, wherein magnetic means act between the closure parts to produce a force of attraction in order to magnetically support the transfer of the closure device into the closed state.

SUMMARY OF THE INVENTION

It is an object underlying the proposed solution to provide a closure device that is to be closed easily and in a closed position can provide a firm connection between closure parts, with a comfortable handling for opening the closure device.

This object is achieved by a closure device with features as described herein.

In the closure device, the first closure part accordingly includes a first magnetic element and the second closure part includes a second magnetic element, wherein the first magnetic element and the second magnetic element cooperate in a magnetically attracting manner when the locking element and the engagement element are attached to each other.

In the closure device, a loadable connection between the closure parts is created in that on the side of the first closure part the force transmission element is operatively connected to the locking element, and when a load acts on the force transmission element, the locking element of the first closure part is secured in its engagement with the engagement element of the second closure part. Thus, a load acting on the force transmission element leads to an action of force on the locking element in a locking direction towards contact with the engagement element so that a load acting on the force transmission element effects that the locking element is held in engagement with the engagement element in a force-loaded way.

Closing of the closure device here can be effected in a comfortable way in that the attachment of the locking element and the engagement element to each other is magnetically supported by magnetic elements of the closure parts. The magnetic elements cooperate in a magnetically attracting way such that the attachment of the locking element and the engagement element is magnetically supported, and thus the locking element and the engagement element preferably come into engagement with each other at least largely automatically when the locking element and the engagement element are attached to each other.

Moreover, opening of the closure device also can be effected comfortably and easily, in particular on removal of the load acting on the force transmission element. For opening, the actuating element can be actuated, which is operatively connected to the locking element such that on actuation of the actuating element the locking element is adjusted against the adjustment direction. The adjustment of the locking element here can be effected by action of the actuating element on the locking element. The adjustment of the locking element, however, can also be effected for example by a pretension and/or elasticity on the locking element, without the actuating element therefor acting directly on the locking element, so that in this case the actuating element merely provides for resetting of the locking element from the closed position, but resetting of the locking element is effected at least largely automatically due to for example a pretension and/or elasticity on the locking element.

The actuating element and the locking element can also be made in one piece, e.g. geometrically in the manner of a parallelogram, in which an actuation at one corner effects a change in angle, for example spreading, of an opposite angle. In this case, portions of the locking element are movable and actuatable relative to the actuating element.

There can also be provided more than one locking element, which can be jointly actuated via the actuating element.

In one embodiment, the force transmission element is formed by a traction element that can be subjected to a tensile load. The force transmission element for example can be designed to be flexurally slack, in that the force transmission element is formed for example by a rope, a band, a belt, a strap or the like, so that in this case tensile forces, but no compressive forces, can be transmitted via the force transmission element.

In one embodiment, the force transmission element is realized by the housing that changes its position by action of force and thereby blocks the locking element. In this embodiment, an additional force transmission element can be omitted.

The closure parts of the closure device are associated to assemblies that are to be connected to each other via the closure device. One assembly here for example is firmly connected to the second closure part, while the other assembly is connected to the first closure part, in particular to the force transmission element of the first closure part. When there is an action of force between the assemblies, a load can act on the force transmission element so that an action of force between the assemblies leads to securing of the connection, in that on action of a load on the force transmission element a force is acting on the locking element and the locking element thereby is kept in contact with the engagement element.

In one embodiment, the force transmission element includes an acting portion that at least sectionally is circumferentially extended around the locking element. Via the acting portion, in particular an action of force can be effected radially to the inside so that the locking element is force-loaded radially to the inside towards contact with the engagement element, when a load is acting on the force transmission element along the direction of force.

When the force transmission element is formed by a flexurally slack traction element, the acting portion can be formed for example by a loop that is arranged on the locking element and is operatively connected to the locking element such that when a tensile load is acting on the force transmission element, the locking element is loaded radially to the inside and the locking element thus is held in engagement with the engagement element engaging into the locking element.

In one embodiment, the first closure part includes a housing relative to which the locking element is elastically adjustable. The locking element for example can have one or more legs, which can be elastically adjusted in order to bring the locking element into engagement with the engagement element for closing the closure device and out of engagement with the engagement element for opening the closure device. The locking element can be elastically pretensioned relative to the housing, for example by an elastic connection with the housing or by one or more spring elements via which the locking element is elastically pretensioned with respect to the housing. The locking element, however, can also be designed to be elastic in itself, so that for example legs of the locking element can be elastically adjusted relative to each other.

In one embodiment, the actuating element is force-loaded relative to the housing in the direction of a non-actuated position. Such force loading can be effected for example by a mechanical spring element via which the actuating element is resiliently pretensioned relative to the housing. Such force loading can, however, also be effected for example magnetically, in that in the closed position of the closure device the actuating element is loaded in the direction of a non-actuated position by magnetic action.

Thus, the actuating element is pretensioned in the direction of a non-actuated position. After actuation, the actuating element thus automatically returns into its non-actuated position so that the closure device can be closed again by attaching the closure parts to each other, in that the locking element of the first closure part and the engagement element of the second closure part are attached to each other and brought into engagement with each other.

In one embodiment, the first magnetic element is arranged on the actuating element and on actuation of the actuating element movable together with the actuating element. By magnetic interaction between the first magnetic element on the actuating element of the first closure part and the second magnetic element on the engagement element of the second closure part, the closure parts are magnetically attracted on attachment to each other for closing the closure device, so that closing of the closure device is supported magnetically. Due to the fact that the first magnetic element is arranged on the actuating element, the actuating element at the same time can be moved into its non-actuated position so that the locking element of the first closure part and the engagement element of the second closure part can be brought into engagement with each other and the closure parts thus can be connected to each other. When the actuating element is moved to open the closure device, the magnetic elements also are moved relative to each other, whereby for example the force of magnetic attraction between the magnetic elements is attenuated and opening of the closure device thus can be facilitated by releasing the closure device from each other.

In one embodiment, the locking element includes an elastically deformable elasticity portion and at least one leg arranged on the elasticity portion, which can be brought in contact with the engagement element. For example, the locking element can have a U-shaped design with two legs that are connected to each other via the elasticity portion, wherein the legs are elastically adjustable relative to each other by elastic deformation of the elasticity portion in order to produce an engagement with the engagement element and also again release the engagement with the engagement element.

The force transmission element preferably is arranged on the at last one leg in such a way that when a load is acting on the force transmission element, a force acts on the at least one leg and the at least one leg is loaded in the direction of the locking direction into contact with the engagement element.

When the force transmission element is designed for example as a flexurally slack traction element, for example in the form of a rope, a band, a belt, a strap or the like, a channel-shaped rope groove can be formed for example on the at least one leg, in which the force transmission element is arranged and via which an operative connection between the force transmission element and the at least one leg is produced. When a load is acting on the force transmission element, an action of force accordingly occurs at the leg in the direction of an engagement with the engagement element.

In one embodiment, the actuating element includes an actuating portion which on actuation of the actuating element acts on the at least one leg in order to adjust the at least one leg against the locking direction for releasing the connection between the locking element and the engagement element. In this case, the actuating element acts directly on the locking element in order to adjust the locking element for releasing the connection between the closure parts and thereby bring it out of engagement with the engagement element. The actuating portion can be designed for example in the manner of an inclined plane in such a way that on actuation of the actuating element the actuating portion runs up onto an associated portion of the locking element, for example onto the at least one leg of the locking element, and thereby adjusts the at least one leg against the locking direction.

The actuating element can be actuatable along an actuating direction that is directed perpendicularly to the locking direction. Due to the operative connection between the actuating element and the locking element, a force deflection thus occurs, due to which on actuation of the actuating element along the actuating direction the locking element is adjusted transversely to the actuating direction, namely against the locking direction, so as to be able to eliminate the engagement between the locking element and the engagement element and release the closure parts from each other.

In one embodiment, the locking element has a locking portion which in the closed position positively is in engagement with the engagement element. Thus, in the closed position there is a positive engagement between the locking element and the engagement element so that the closure parts thereby are positively held at each other. When a load is acting on the force transmission element, the engagement is additionally secured by action of a force on the locking element so that under load the closure device cannot or at least not easily be opened. (Easy) opening of the closure device is possible only on removal of the load by actuation of the actuating element.

To relieve the force transmission element, for example a handle can be arranged on the force transmission element, which handle can be grasped by a user in order to reduce an introduction of force into the first closure part via the force transmission element.

In another embodiment, a frictional connection between the locking element and the engagement element can also exist for example in the closed position, since friction surfaces of the locking element and the engagement element associated to each other non-positively are in contact with each other when the closure device is in its closed position. On action of a load on the force transmission element, the frictional connection is secured in that the locking element is loaded into contact with the engagement element.

In one embodiment, the first closure part includes a form-fit element in the form for example of a button or a pin, which blocks the movement of the actuating element so that the closure cannot accidentally be opened even without a load.

One system for example includes a useful assembly and a closure device as described above. The useful assembly for example can be arranged on the force transmission element so that on action of a force on the useful assembly via the force transmission element a load is introduced into the first closure part and a connection between the closure parts of the closure device thereby is secured.

The useful assembly for example can be configured by a tool, for example in the form of an electric tool such as a cordless screwdriver, a drill or the like, or also in the form of a non-electric tool such as a hammer, a wrench or pliers. Via the closure device, the useful assembly can be attached to a superordinate assembly, for example to a carrying device, for example a ladder, a scaffold, a vehicle or the like, wherein on action of a load on the useful assembly the connection is secured and on removal of the load the connection can be released in order to separate the useful assembly from the superordinate assembly.

According to another aspect, a system includes a useful assembly and a closure device. The closure device includes a first closure part and a second closure part. The first closure part comprises a force transmission element loadable along a direction of force, which is connected to the useful assembly, and a first magnetic element. The second closure part comprises a second magnetic element. The first closure part and the second closure part can be attached to each other, are connected to each other in a closed position and can be released from each other for opening the closure device. The first magnetic element and the second magnetic element cooperate in a magnetically attracting manner on attachment of the first closure part and the second closure part to each other. It is provided that the force transmission element includes a shock-diminishing portion that is deformable on action of a load on the force transmission element.

The closure device can be designed in particular as described above so that reference fully is made to the preceding explanations concerning advantages and advantageous embodiments.

The force transmission element can be configured in particular as a traction element for transmitting tensile forces, preferably exclusively tensile forces. The force transmission element for example can be of flexurally slack design, for example in the form of a rope, band, belt, strap or the like. Via the force transmission element a useful assembly, for example a tool, can be connected to the first closure part, wherein the useful assembly can releasably be fixed to a superordinate assembly via the closure device.

The shock-diminishing portion deformable on action of a load on the force transmission element in particular can undergo a change in length on action of an impact load on the force transmission element. The shock-diminishing portion for example can include layers sewn together, wherein on action of an impact load that exceeds a limit force determined by the seam strength the seams will tear and the shock-diminishing portion thus can be lengthened.

The shock-diminishing portion in particular can be plastically and irreversibly deformable, in particular due to the tearing of seams. Alternatively, the shock-diminishing portion can also be elastically deformable.

BRIEF DESCRIPTION OF THE DRAWINGS

The idea underlying the proposed solution will be explained in detail below with reference to the exemplary embodiments illustrated in the Figures.

FIG. 3 shows an exploded view of the arrangement of FIG. 1.

FIG. 4 shows an exploded view of the closure device, comprising a force transmission element on the first closure part.

FIG. 5A shows a top view of the closure device in a closed position.

FIG. 5B shows a sectional view along line A-A of FIG. 5A.

FIG. 6A shows a top view of the closure device on actuation of an actuating element for opening the closure device.

FIG. 6B shows a sectional view along line A-A of FIG. 6A.

FIG. 7A shows a top view of the closure device during closing.

FIG. 7B shows a side view of the closure device.

FIG. 7C shows a sectional view along line A-A of FIG. 7A.

FIG. 7D shows an enlarged view in section B of FIG. 7C.

FIG. 9A shows a top view of the closure device in a closed position.

FIG. 9B shows a side view of the closure device.

FIG. 9C shows a sectional view along line A-A of FIG. 9A.

FIG. 10A shows a top view of the closure device in a closed position, under load.

FIG. 10B shows a side view of the closure device.

FIG. 10C shows a sectional view along line A-A of FIG. 10A.

FIG. 10D shows a sectional view along line C-C of FIG. 10B.

FIG. 11A shows a top view of the closure device in the closed position, on removal of a load.

FIG. 11B shows a side view of the closure device.

FIG. 11C shows a sectional view along line A-A of FIG. 11A.

FIG. 11D shows a sectional view along line C-C of FIG. 11B.

FIG. 12D shows a sectional view along line C-C of FIG. 12B.

FIG. 16 shows another view of a closure device comprising an associated useful assembly in the form of a tool with a superordinate assembly, for example a wristband.

DESCRIPTION OF THE INVENTION

Figure 1:
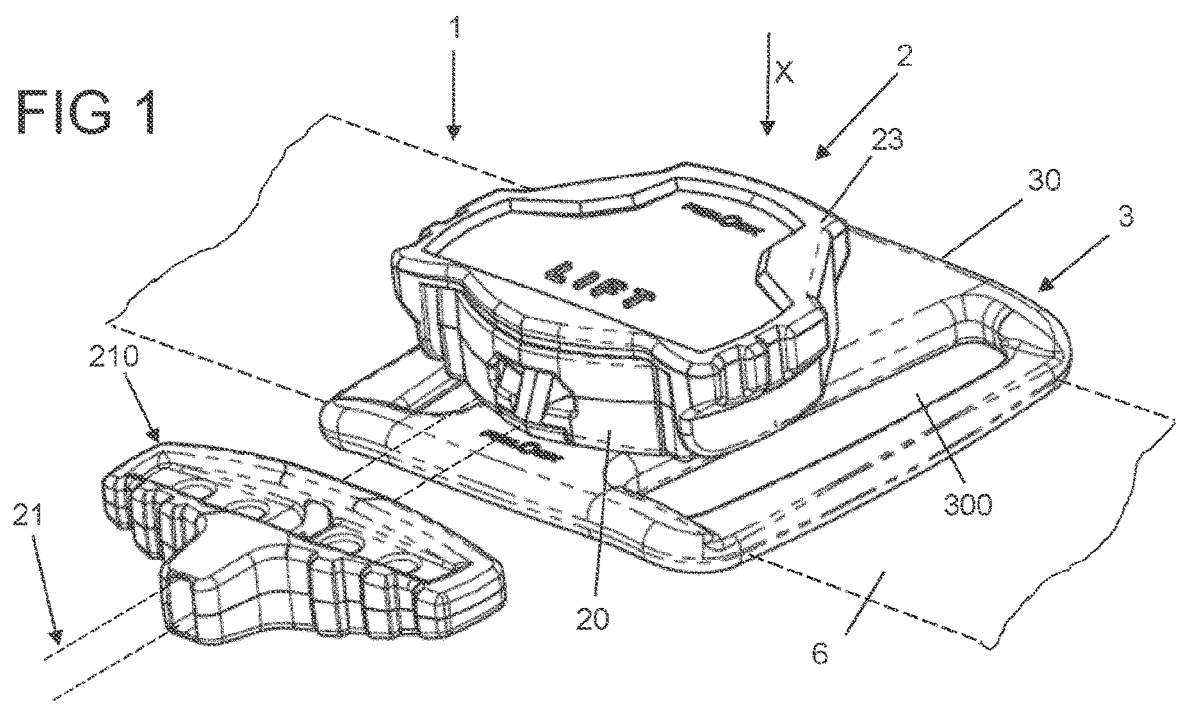
FIG. 1 shows a view of an exemplary embodiment of a closure device comprising a first closure part and a second closure part, which in a closed position are attached to each other and held at each other.

FIGS. 1 to 13A-13D show an exemplary embodiment of a closure device 1 which includes a first closure part 2 and a second closure part 3 and serves for connecting two assemblies to each other. A first assembly here is associated to the first closure part 2, while a second assembly is associated to the second closure part 3 so that by connecting the closure parts 2, 3 to each other the assemblies can be fixed to each other.

The closure parts 2, 3 can be attached to each other along a closing direction X and are held at each other in a closed position so that the assemblies associated to the closure parts 2, 3 are connected to each other via the closure parts 2, 3. The first closure part 2 can be actuated in order to release the connection between the closure parts 2, 3 and thereby separate the assemblies associated to the closure parts 2, 3 from each other.

In the illustrated exemplary embodiment, the first closure part 2 has a housing 20 that is formed by two housing parts 200, 201, which to complete the housing 20 are attached to each other and firmly connected to each other.

The housing 20 encloses a locking element 24 which in the illustrated exemplary embodiment has a U-shaped design, comprising two legs 244, 245 that are connected to each other via an elasticity portion 243 and are elastically adjustable relative to each other by elastic deformation of the elasticity portion 243.

On the housing 20, there is also arranged an actuating element 23 that is shiftable on the housing 20 along an actuating direction B opposite to the closing direction X and is operatively connected to the locking element.

On a front side, the housing part 201 forms an opening 202 which is divided in two portions by a guide portion 205 of the housing part 200 and via which a force transmission element 21 in the form of a flexurally slack traction element, shown for example in the exploded view of FIG. 4, is introduced into the housing 20. On the force transmission element 21 a handle 210 is arranged, via which a user can grasp the force transmission element 21. An assembly associated to the closure part 2 can be connected to the force transmission element 21, wherein such an assembly effects a (tensile) load acting on the closure part 2 in a force direction F (see for example FIG. 7A).

For connecting the closure parts 2, 3 to each other, an engagement element 31 of the second closure part 3 can be inserted into an opening 204 on the bottom of the housing part 201 and be brought into engagement with locking portions 241 formed by inner edges of the legs 244, 245 in the region of a bottom 240 of the locking element 24, as this can be taken for example from the views of FIGS. 5A and 5B. In a closed position, the locking portions 241 of the legs 244, 245 are in engagement with a circumferential locking protrusion 310 at a head end of the pin-shaped engagement element 31 of the closure part 3 located away from a base 30, so that a positive connection thereby is produced between the closure parts 2, 3.

On an inside facing the locking element 24, the actuating element 23 includes a protruding portion 230 which extends through an opening 203 on an upper side of the housing part 200, and on sides facing away from each other carries actuating portions 231 via which an operative connection to the legs 244, 245 of the locking element 24 is produced, as this can be taken for example from FIG. 5B in a synopsis with FIG. 6B. The locking portions 231 each are associated to one of the legs 244, 245 and protrude into an engagement opening 242 of the locking element 24 in such a way that during an actuation of the actuating element 23 in an actuating direction B the actuating portions 231 designed in the manner of inclined planes run up onto edge portions at the legs 244, 245 in the region of the engagement opening 242 and thereby adjust the legs 244, 245 along a spreading direction A for spreading apart the locking element 24, as this can be taken from FIG. 6B.

Figure 9D:
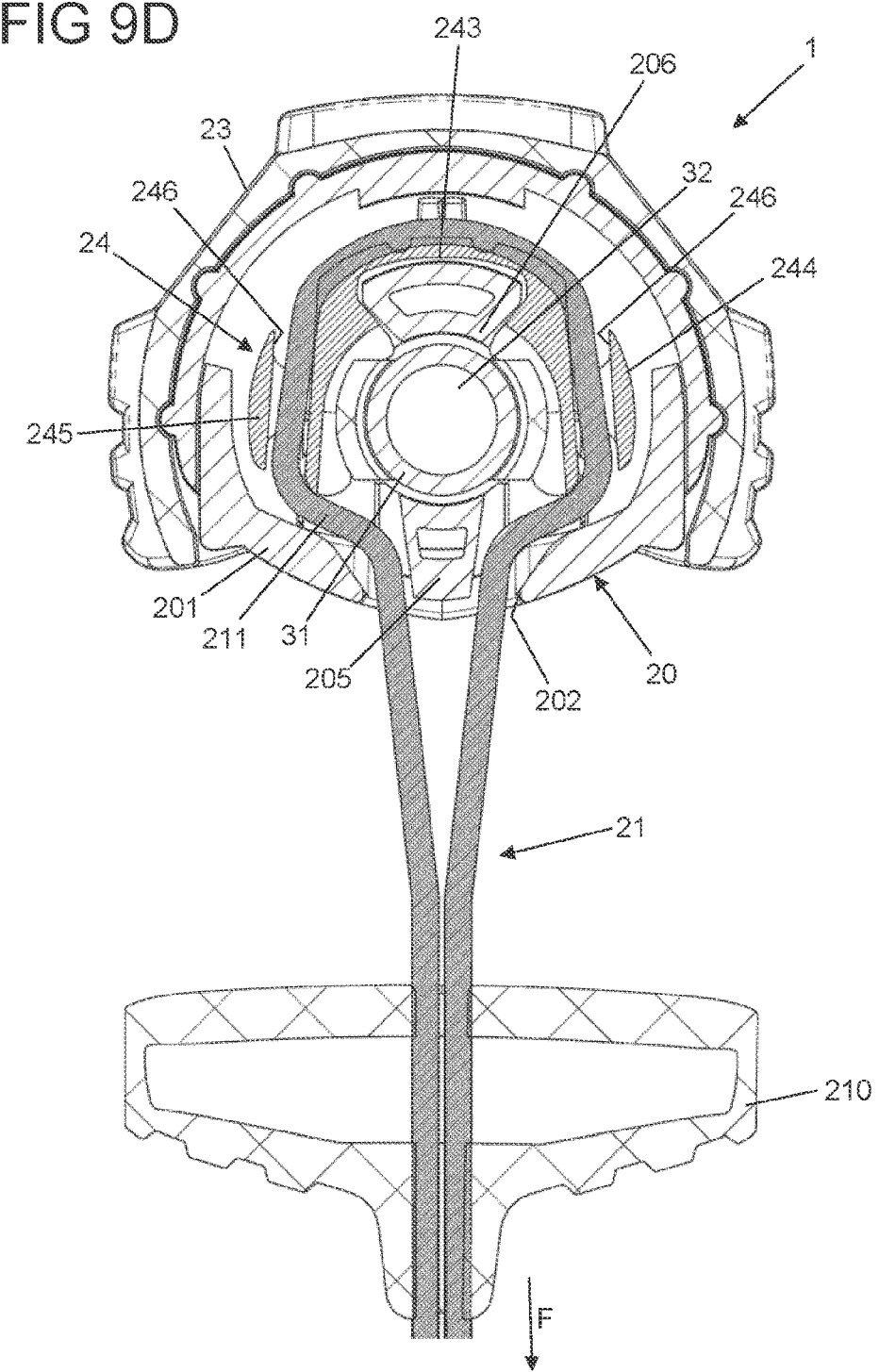
FIG. 9D shows a sectional view along line C-C of FIG. 9B.
Figure 12A:
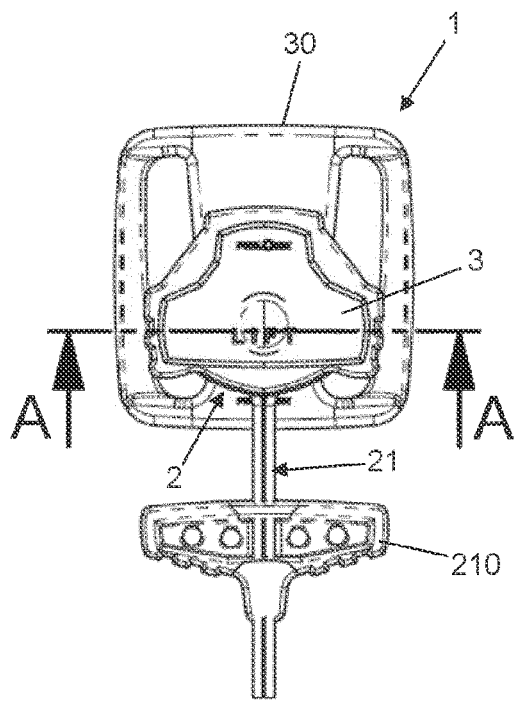
FIG. 12A shows a top view of the closure device, on actuation of the actuating element for opening the closure device.
Figure 12B:
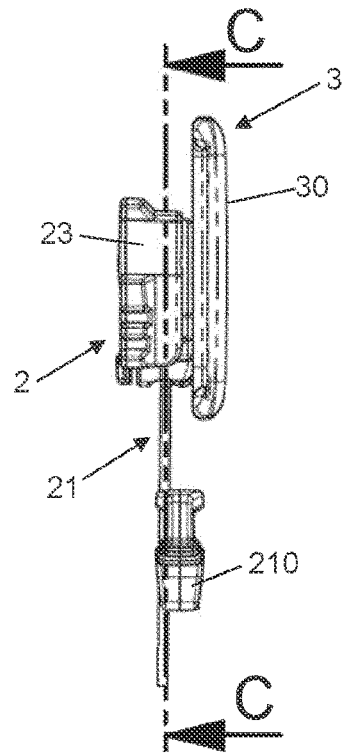
FIG. 12B shows a side view of the closure device.
Figure 12C:
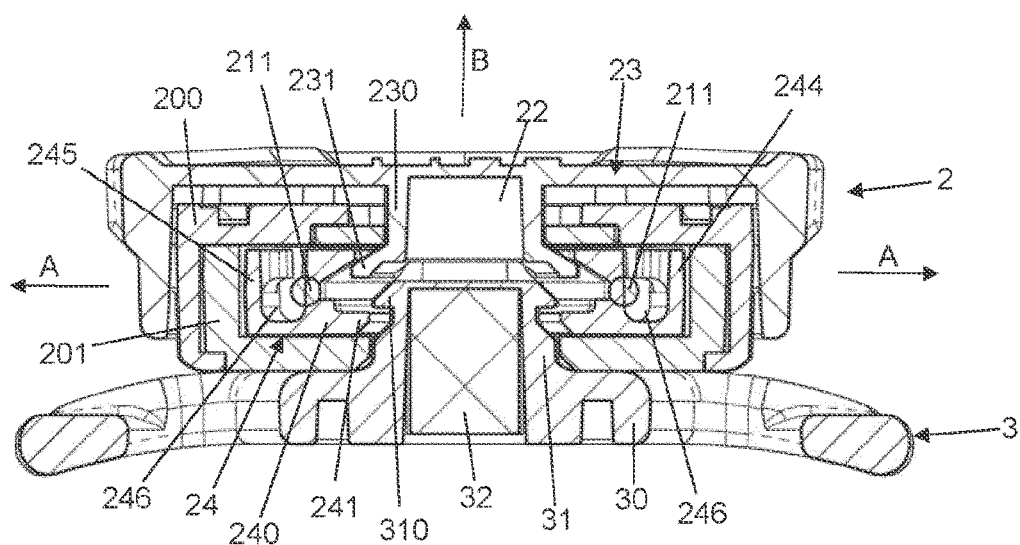
FIG. 12C shows a sectional view along line A-A of FIG. 12A.
Figure 13A:
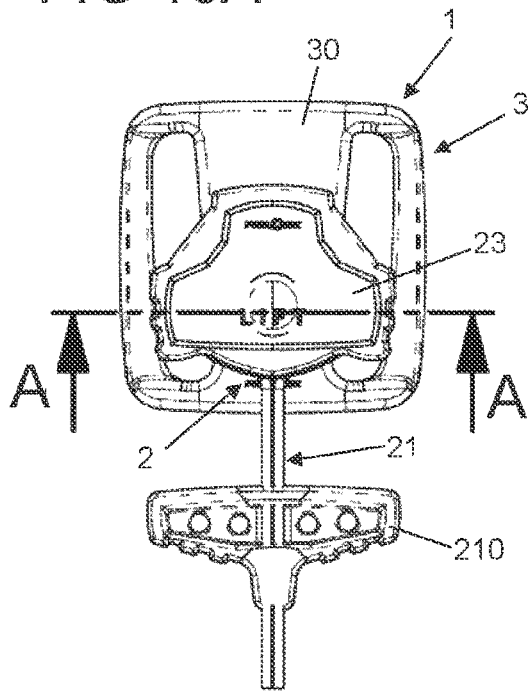
FIG. 13A shows a top view of the closure device when the closure device is open.
Figure 13B:
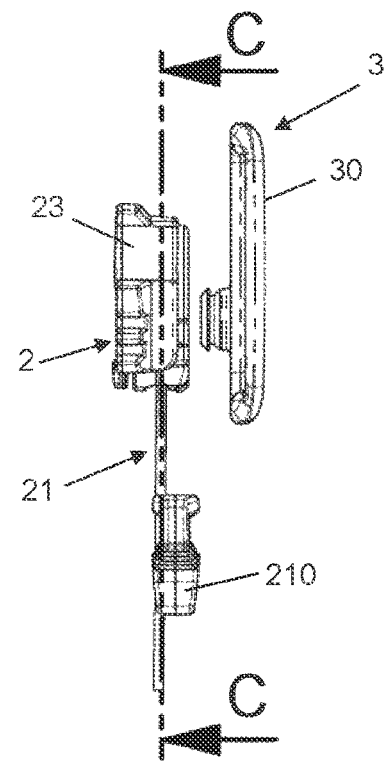
FIG. 13B shows a side view of the closure device.
Figure 13C:
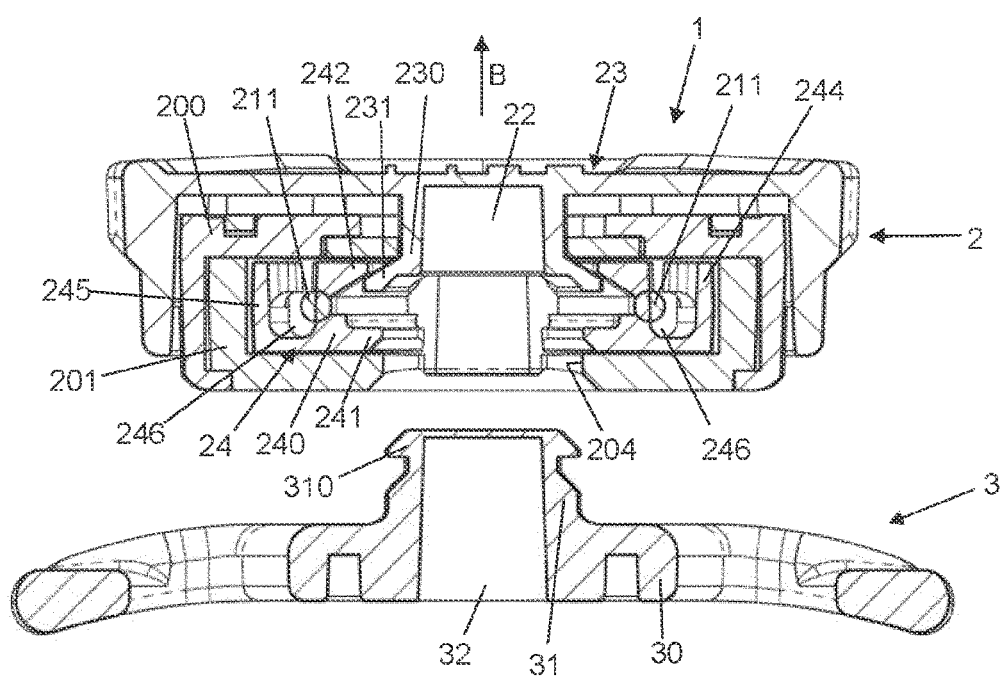
FIG. 13C shows a sectional view along line A-A of FIG. 13A.
Figure 13D:
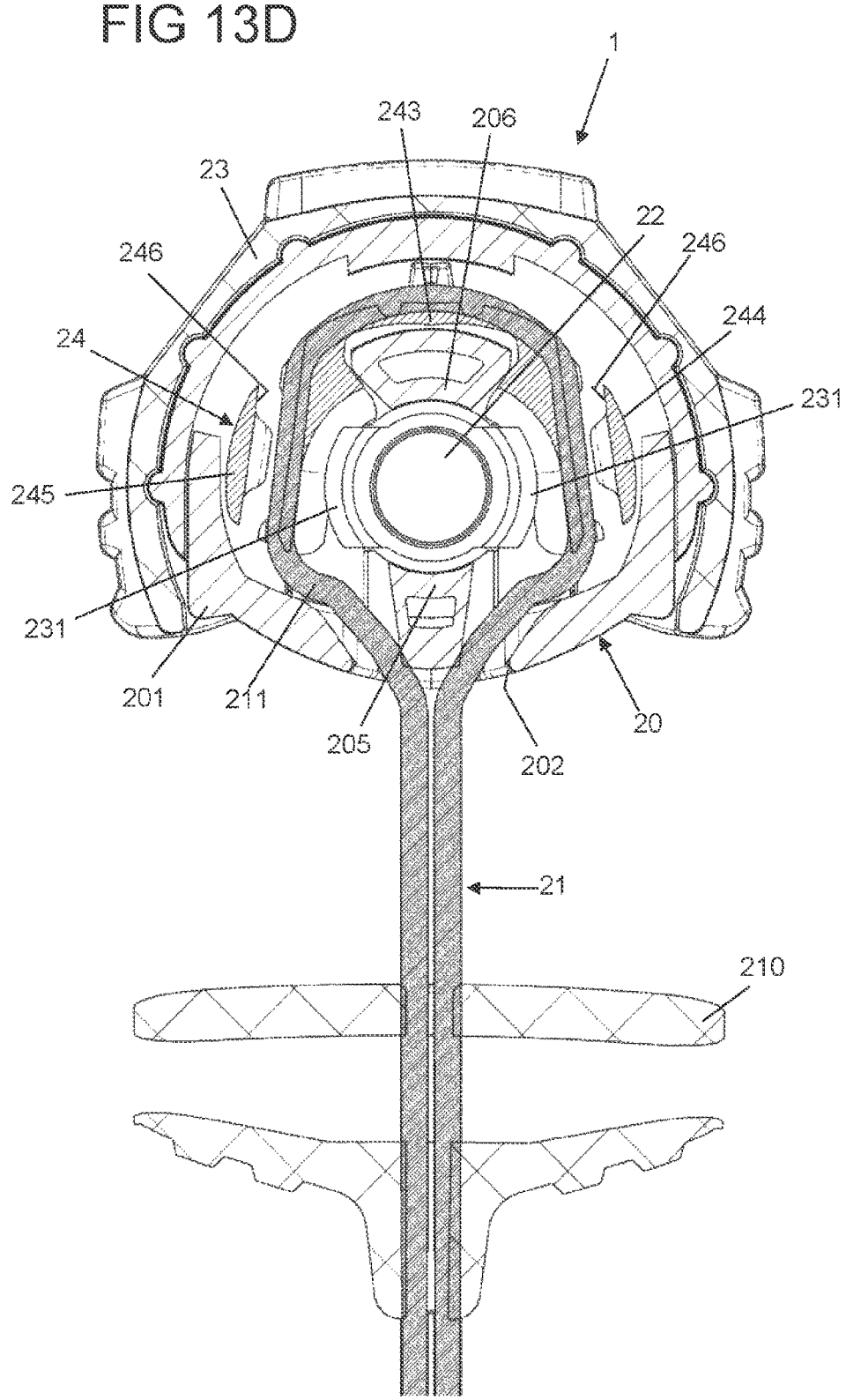
FIG. 13D shows a sectional view along line C-C of FIG. 13B.

The force transmission element 21 forms an acting portion 211 in the manner of a loop that is placed around the locking element 24, as this can be taken for example from FIG. 4 in a synopsis with FIG. 9D. Each of the legs 244, 245 of the locking element 24 includes a rope groove 246 in the form of a channel, through which the force transmission element 21 is extended. The acting portion 211 is placed around the outside of the elasticity portion 243 and, as shown in FIG. 9D, extends through both rope grooves 246 of the legs 244, 245 and through the opening 202 in the housing 20.

The closure device 1 includes magnetic elements 22, 32 of which one magnetic element 22 is arranged on the portion 230 of the actuating element 23 and thus on the first closure part 2 and the other magnetic element 32 is arranged on the engagement element 31 of the second closure part 3. The magnetic elements 22, 32 cooperate in a magnetically attracting manner in such a way that the attachment of the closure parts 2, 3 for closing the closure device 1 is magnetically supported and the engagement element 31 of the closure part 3 substantially automatically comes into engagement with the locking element 24 of the closure part 2.

For closing the closure device, the closure parts 2, 3 can be attached to each other along the closing direction X, as this can be taken from FIGS. 7A-7D and 8A-8D, so that the engagement element 31 gets in contact with the locking portions 241 of the legs 244, 245 through the opening 204 at the bottom of the housing 20 and spreads the legs 244, 245 against each other along the spreading direction A by running up onto the locking portions 241, so that the locking element 24 is widened and the engagement element 31 snaps into engagement with the legs 244, 245.

In a closed position, shown in FIGS. 9A-9D, the locking portions 241 of the legs 244, 245 are in engagement with the locking protrusion 310 of the engagement element 31 in the region of the bottom 240 of the locking element 24 so that a positive connection is produced between the closure parts 2, 3.

The attachment of the closure parts 2, 3 here is supported by the magnetic elements 22, 32 of the closure parts 2, 3 in a magnetically attracting way so that the engagement is produced substantially automatically.

Due to the fact that the magnetic element 22 is arranged on the portion 230 of the actuating element 23, the actuating element 23 is loaded during closing into a non-actuated position in which the actuating element 23 in particular does not act on the locking element 24 for spreading apart.

Figure 2A:
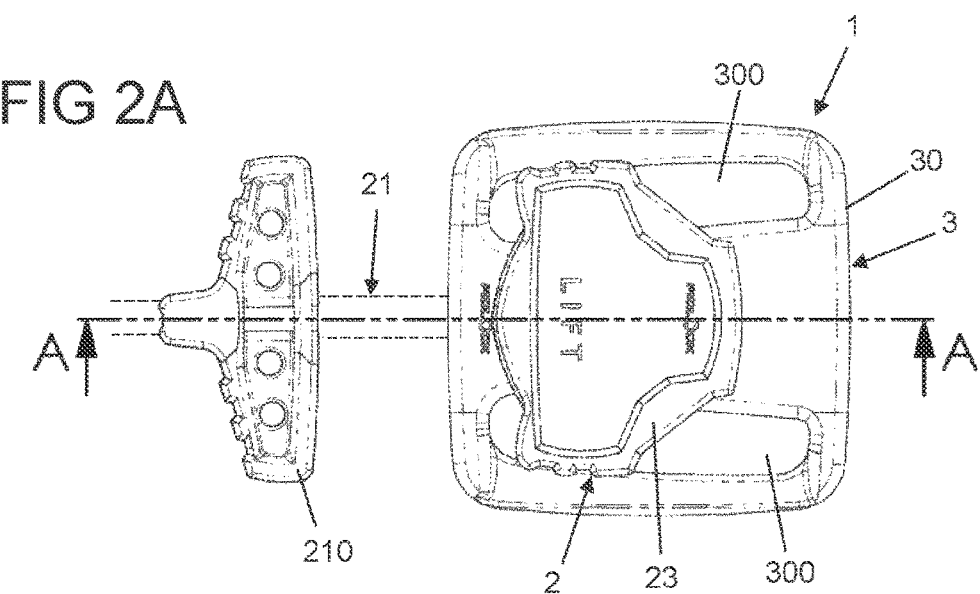
FIG. 2A shows a top view of the arrangement of FIG. 1.
Figure 2B:
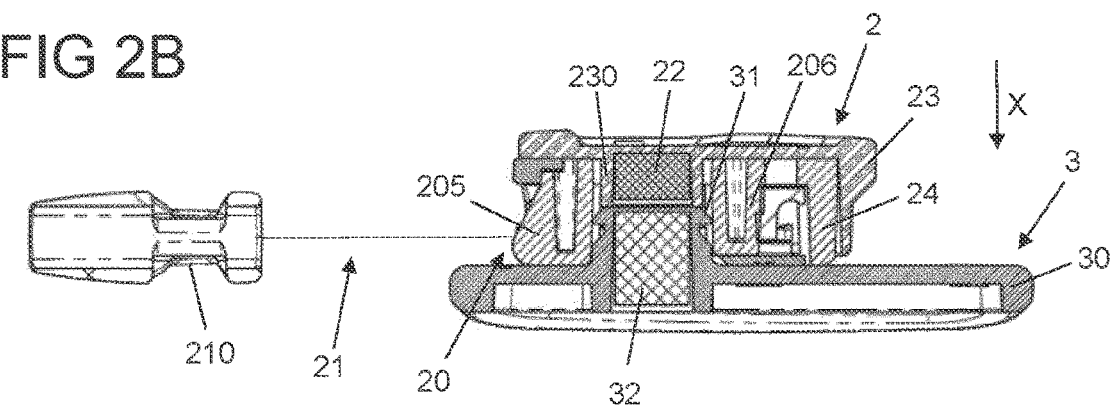
FIG. 2B shows a sectional view along line A-A of FIG. 1.
Figure 8A:
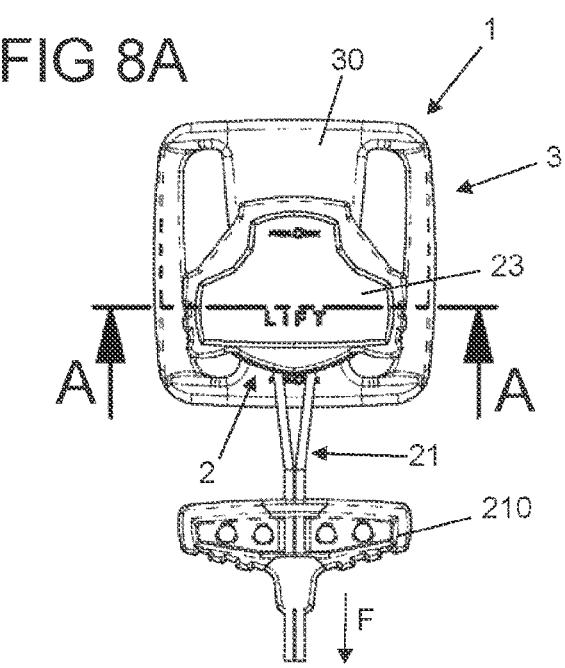
FIG. 8A shows a top view of the closure device during further closing.
Figure 8B:
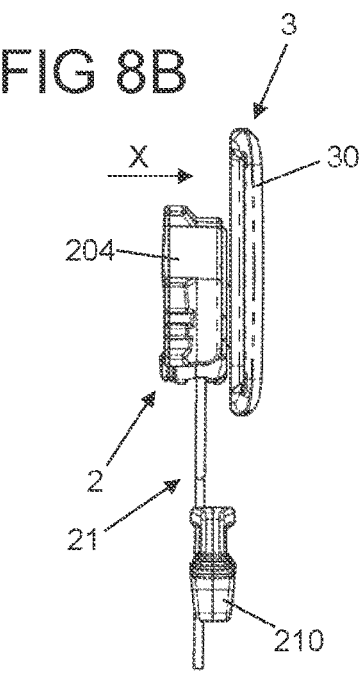
FIG. 8B shows a side view of the closure device.
Figure 8C:
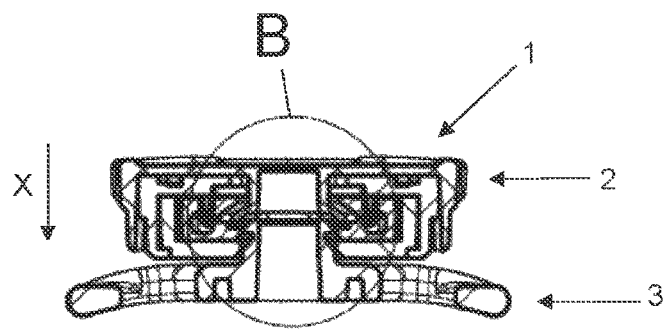
FIG. 8C shows a sectional view along line A-A of FIG. 8A.
Figure 8D:
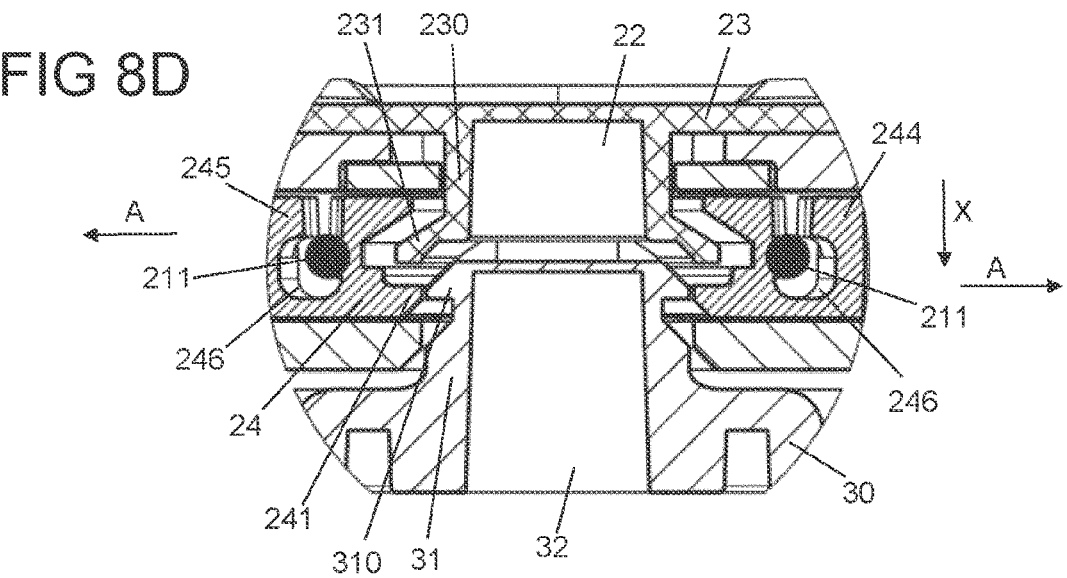
FIG. 8D shows an enlarged view in section B of FIG. 8C.

Guide portions 205, 206 are integrally molded to the housing part 201 of the housing 20, as this can be taken for example from FIG. 4 in a synopsis with FIG. 2B. On attachment of the closure parts 2, 3 to each other along the closing direction X, the engagement element 31 of the closure part 3 slides between the guide portions 205, 206 and thereby is guided on the housing 20 so that tilting of the closure parts 2, 3 during attachment to each other is counteracted.

When, in the closed position of the closure device 1, a load force is introduced into the force transmission element 31 in a force direction F, i.e. corresponding to a tensile load acting on the force transmission element 21, the acting portion 211 in the form of the loop is contracted and thereby adjusts the legs 244, 245 of the locking element 24 radially to the inside, as this can be taken from FIGS. 10A-10D. As a result, the locking portions 241 on the inside of the legs 244, 245 are pressed into engagement with the locking protrusion 310 of the engagement element 31 so that the positive connection between the closure parts 2, 3 is secured when a load is acting on the force transmission element 21 and thus, under load, the closure parts 2, 3 cannot easily be released from each other.

When the closure parts 2, 3 are to be released from each other, the force transmission element 21 is to be unloaded. When no load forces are acting on the force transmission element 21 in the force direction F, no special action must be taken for this purpose. Without being loaded, the locking element 24 of the closure part 2 gets into the position as shown in FIGS. 9A-9D. On the other hand, when a load is acting on the force transmission element 21, a user can grasp the handle 210 and pull the same (slightly) in a relief direction L towards the closure device 1 so that the force transmission element 21 thereby is unloaded at least in the region of the closure device 1.

When the force transmission element 21 and thus the locking element 24 is unloaded, corresponding to the position as shown in FIGS. 11A-11D, a user can grasp the actuating element 23 and adjust the same in the actuating direction B towards the housing 20, as this is shown in the transition from FIGS. 11A-11D towards FIGS. 12A-12D. On actuation of the actuating element 23, the actuating portions 231 on the portion 230 run up onto the legs 244, 245 of the locking element 24 and thereby spread the same towards the outside in the spreading direction A so that the engagement between the locking element 24 and the engagement element 31 is eliminated, as this can be taken in particular from FIG. 12C.

Thus, as shown in FIGS. 13A-13D, the closure parts 2, 3 can be released from each other, wherein this can be effected along the actuating direction B and thus in a sequence of movements with an actuation of the actuating element 23.

Due to the fact that the magnetic element 22 is arranged on the actuating element 23, the magnetic element 22 also is removed from the magnetic element 32 on the engagement element 31 of the closure part 3 on actuation of the actuating element 23, so that the magnetic attraction between the closure parts 2, 3 is attenuated and the closure parts 2, 3 can be detached from each other with little force.

A closure device 1, as it has been described with reference to the exemplary embodiment of FIGS. 1 to 13A-13D, for example can serve for connecting two assemblies to each other, of which one assembly is arranged on the force transmission element 21 and another assembly is arranged on the base 30 of the closure part 3. The assembly associated to the closure part 3 can be realized for example by a belt 6 that is fixed to the base 30 via fastening elements in the form of belt attachments 300, as this is schematically indicated in FIG. 1.

Figure 14:
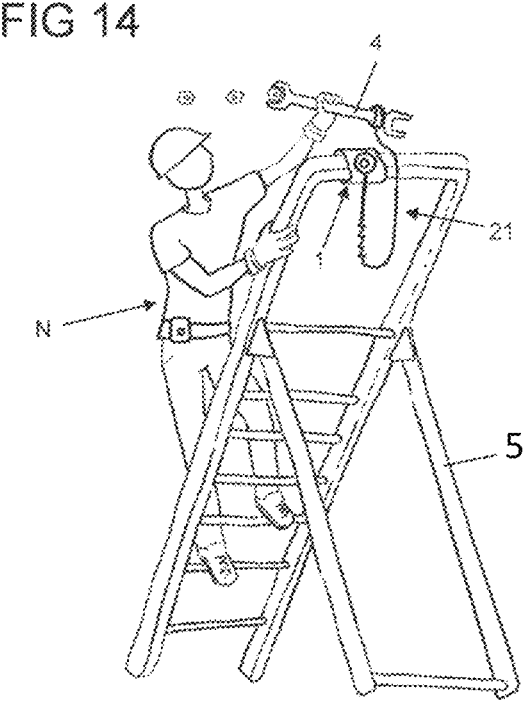
FIG. 14 shows a view of a closure device for connecting a useful assembly in the form of a tool to a superordinate assembly, for example a ladder.

In an example shown in FIG. 14, an assembly in the form of a tool 4 is connected for example to the force transmission element 21, which in the illustrated example is formed by a flexurally slack traction element in the form of a rope, a band, a belt or a strap. In this case, the closure device 1 serves for securing the assembly in the form of the tool 4 and fixes the tool 4 to a superordinate assembly 5 in the form of a ladder. When a user N handling the tool 4 drops the tool 4, the tool 4 is secured to the ladder 5 via the closure device 1. When the user N wants to release the tool 4, he can actuate the closure device 1 for opening and separating the closure parts 2, 3 and thus remove the tool 4.

When working and moving on a ladder or a scaffold, an alternating attachment between user and scaffold hence can be carried out quickly and safely.

The tool 4 can be realized by an electric tool, for example a drill, a cordless screwdriver, a saw or the like, or also by a non-electric tool, for example a hammer, a wrench or any other tool.

Assemblies that are arranged on each other via a closure device 1 can, however, also be of a completely different type so that the use of the closure device 1 is not limited to tools. For example, the closure device 1 can also be used on sports equipment, in pets, for the transport of goods or for closing flaps and doors.

Figure 15:
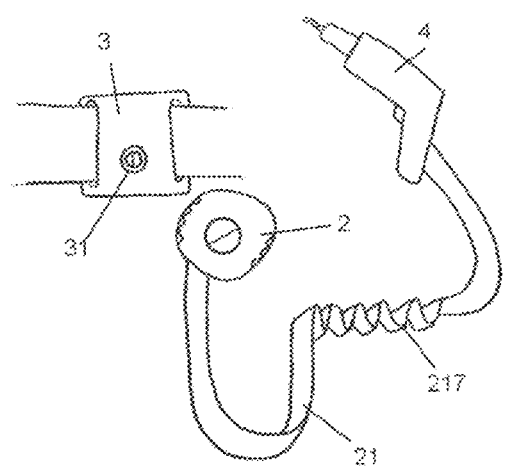
FIG. 15 shows a schematic view of a closure device comprising an associated useful assembly in the form of a tool with a superordinate assembly, for example a belt.

As shown in FIGS. 15 and 16, a shock-diminishing portion 217 can be arranged on the force transmission element 21, which absorbs a shock when the assembly associated to the closure part 2 is dropped, in that a force-induced deformation, for example an elongation, can occur on the shock-diminishing portion 217, as in the example of FIG. 15 or 16.

A force absorption on the portion 217 can be effected for example by tearing seams of band layers sewn together in folded form.

Figure 17A:
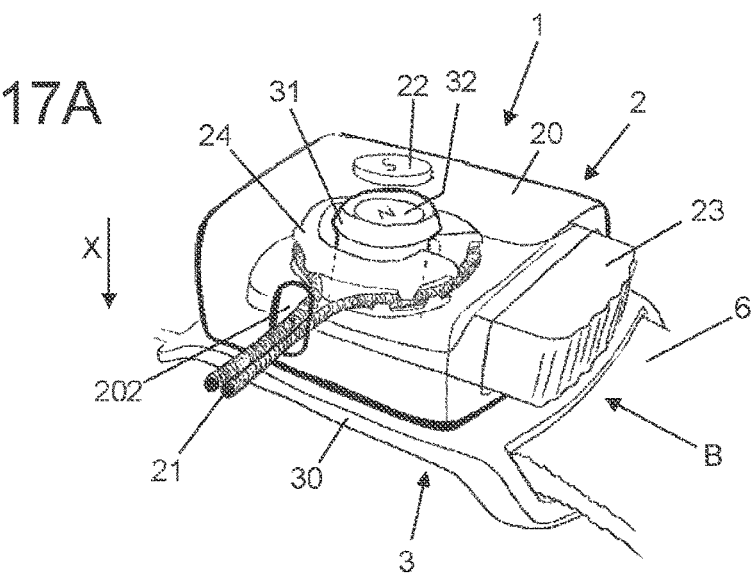
FIG. 17A shows a view of another exemplary embodiment of a closure device, in a closed position, without action of a load on a force transmission element.
Figure 17B:
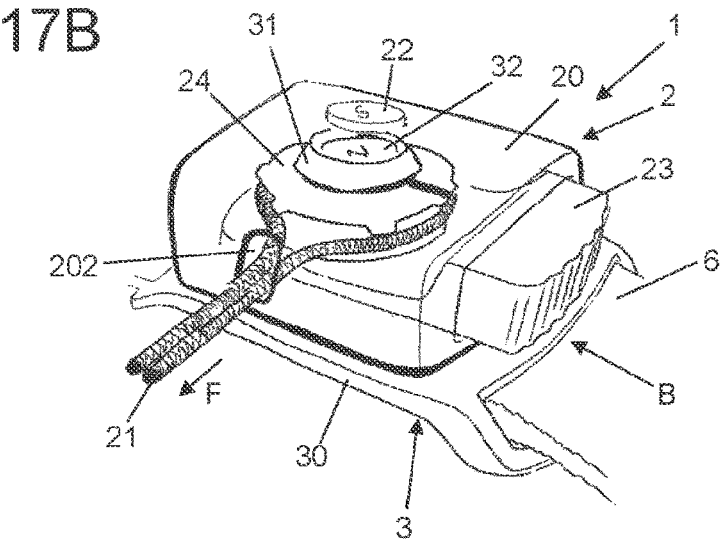
FIG. 17B shows the closure device of FIG. 17A, on action of a load in the closed position.
Figure 17C:
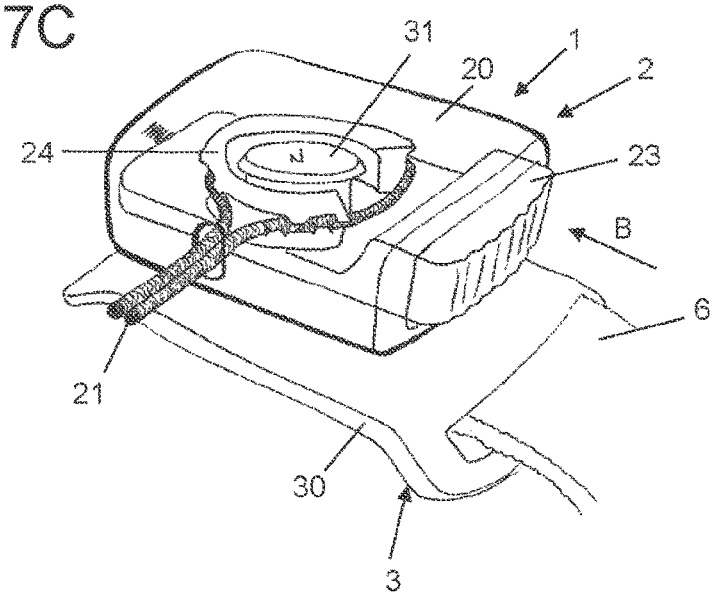
FIG. 17C shows the closure device during opening.

In an exemplary embodiment of a closure device 1 as shown in FIGS. 17A to 17C, closure parts 2, 3 are to be attached to each other along a closing direction X so that in a closed position an engagement element 31 of the closure part 3 is in engagement with a locking element 24 of the closure part 2, as this is shown in FIG. 17A. A force transmission element 21 is placed around the locking element 24 on the closure part 2 so that on action of a load on the force transmission element 21 the locking element 24 is tensioned radially to the inside and pressed into engagement with the engagement element 31, as this is shown in FIG. 17B. Under a load, the connection between the closure parts 2, 3 thus is secured in that the locking element 24 is tensioned in the direction of an engagement with the engagement element 31.

In the exemplary embodiment shown in FIGS. 17A to 17C, an actuating element 23 in the form of a slide shiftable along an actuating direction B is arranged on the closure part 2, which slide is operatively connected to the locking element 24. By shifting the actuating element 23 in the actuating direction B to the housing 20 of the closure part 2, the locking element 24 can be spread, as this is shown in the transition from FIG. 17B towards FIG. 17C, so that the connection between the closure parts 2, 3 can be released—with unloaded force transmission element 21.

In the exemplary embodiment of FIGS. 17A to 17C, the closure parts 2, 3 include magnetic elements 22, 32 which magnetically support the attachment of the closure parts 2, 3. The magnetic element 22 here is arranged on the housing 20 of the closure part 2 so that on attachment a force of magnetic attraction exists between the engagement element 31 of the closure part 3 and the housing 20 of the closure part 2.

In another exemplary embodiment, the magnetic element 22 can be shifted in the actuating direction B on actuation of the actuating element 23 and hence facilitate and possibly magnetically support the ejection of the closure part 3.

Figure 18:
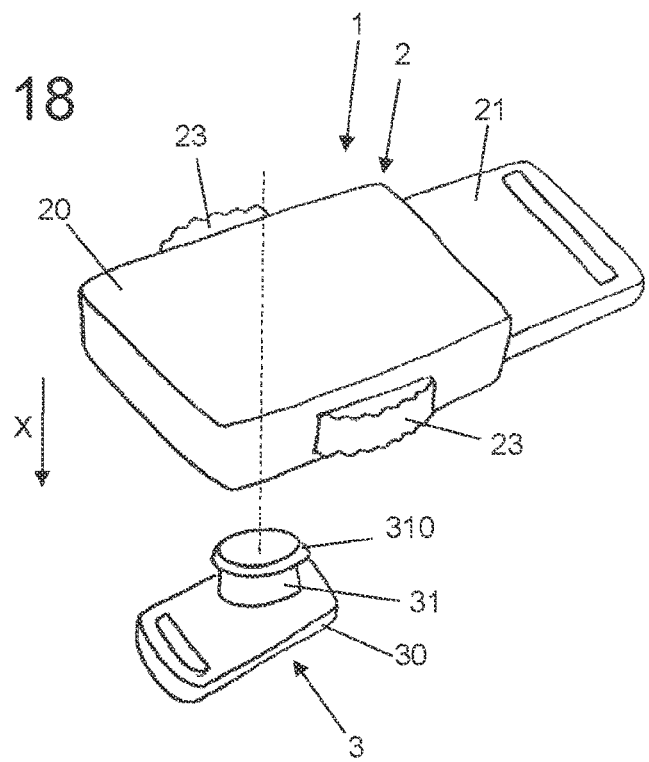
FIG. 18 shows a view of another exemplary embodiment of a closure device.
Figure 19A:
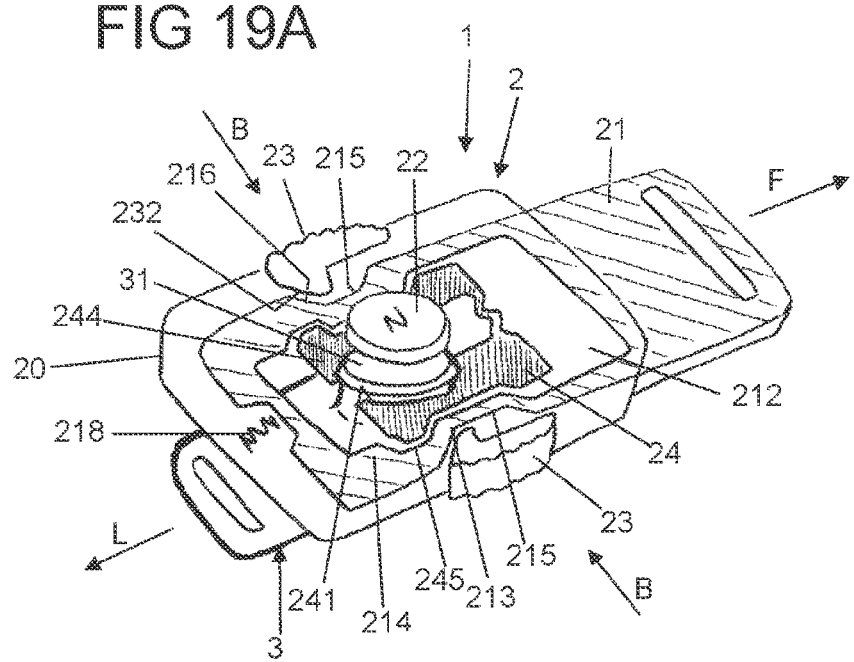
FIG. 19A shows the closure device of FIG. 18 in a closed position.

In an exemplary embodiment shown in FIGS. 18 and 19A-19C, closure parts 2, 3 are to be attached to each other along a closing direction X so that an engagement element 31 of the closure part 3 comes into engagement with a locking element 24 of the closure part 2, as this can be taken from FIG. 18 in a synopsis with FIG. 19A.

In the exemplary embodiment of FIGS. 18 and 19A-19C, the locking element 24 is configured in the form of a U-shaped clamp, comprising legs 244, 245 that are elastically connected to each other via an elasticity portion 243 and are enclosed in a housing 20 of the closure part 2.

In the illustrated exemplary embodiment the force transmission element 21 is realized by a slide element, which includes a central cutout 212 that is circumferentially extended around the locking element 24 and on an inner contour inwardly facing towards the locking element 24 includes protruding portions 213, 214 for interacting with the legs 244, 245 of the locking element 24.

On the force transmission element 21 a traction element in the form of a rope, a band, a belt or the like can be arranged, to which in turn an assembly, for example a tool, can be attached.

On end faces facing away from each other, actuating elements 23 are arranged on the housing 20, which are configured for acting on the force transmission element 21. The actuating elements 23 for example can be pivotally arranged on the housing 20 and can each be pressed into an associated recess 215 on the outside of the force transmission element 21 with an inclined surface formed at an end in such a way that the respective inclined surface 232 runs up onto an associated run-up slope 216 in the region of the recess 215.

When the closure parts 2, 3 are to be attached to each other, the actuating elements 23 for example are to be actuated so that by interaction of the actuating elements 23 with the force transmission element 21, in particular of the inclined surfaces 232 with the run-up slopes 216, the force transmission element 21 is shifted in unloading direction L in the housing 20 into the position shown in FIG. 19A. This is effected against the pretensioning effect of a spring element 218 configured for example as a compression spring.

In the position shown in FIG. 19A, the closure parts 2, 3 can be attached to each other so that the engagement element 31 comes into engagement with the locking element 24, magnetically supported by a magnetically attracting effect of magnetic elements 22, 32 of the closure parts 2, 3. In the position shown in FIG. 19A, the legs 244, 245 can give way in particular radially towards the outside so that the engagement element 31 can be pushed between the legs 244, 245 and can come into positive engagement with the legs 244, 245.

Figure 19B:
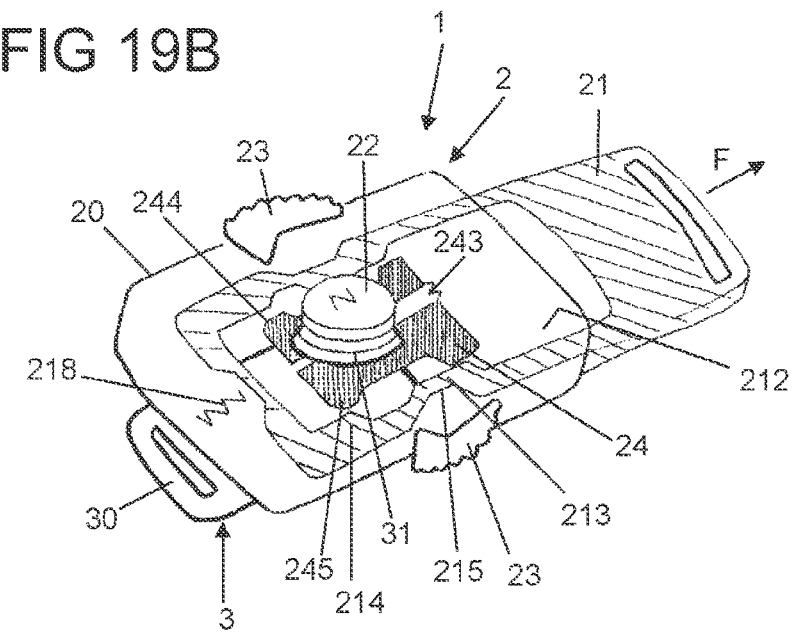
FIG. 19B shows the closure device in the closed position on action of a load.
Figure 19C:
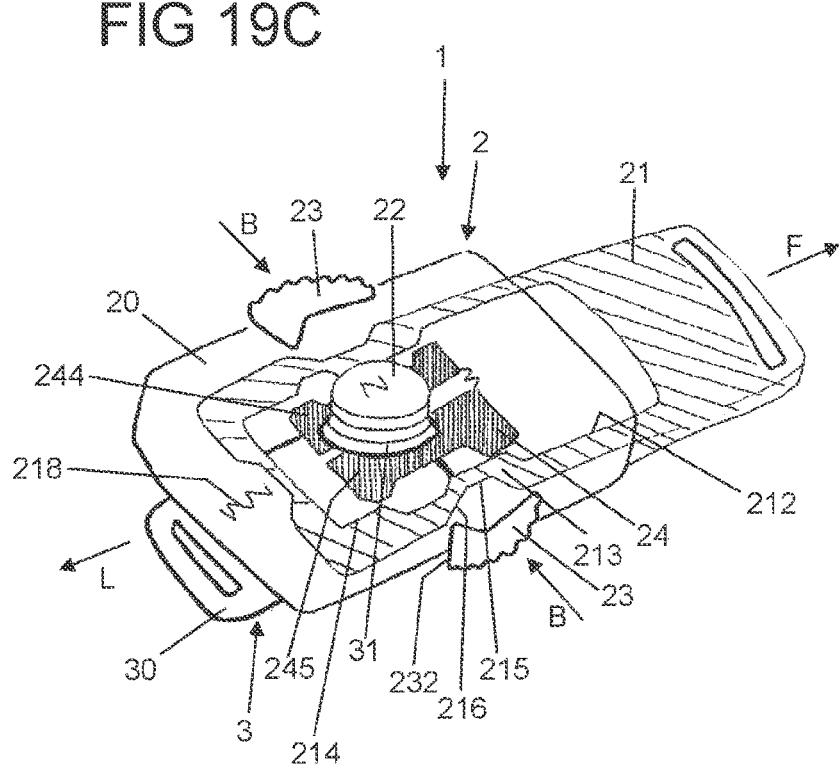
FIG. 19C shows the closure device on actuation for opening.

When the actuating elements 23 are released and the force transmission element 21 is loaded in the force direction F, as this is shown in FIG. 19B, the protruding portions 213, 214 run up onto associated protruding portions of the legs 244, 245 on the inner contour of the force transmission element 21 so that the legs 244, 245 thereby are loaded radially to the inside and are pressed into engagement with the engagement element 31. Thus, the connection between the closure parts 2, 3 is secured—by loading the closure parts 2, 3 relative to each other.

When the closure parts 2, 3 again are to be released from each other, the actuating elements 23, preferably when unloading the force transmission element 21, can be pressed into the housing 20 in the actuating direction B so that the inclined surfaces 232 in turn run up onto the run-up slopes 216 in the region of the recesses 215 on the outside of the force transmission element 21 and thereby adjust the force transmission element 21 in the unloading direction L. The force transmission element 21 thus in turn gets into the position as shown in FIG. 19A. Due to the elastic tension between the legs 244, 245, caused by the elasticity portion 243, the legs 244, 245 are positioned radially towards the outside so that the engagement element 31 can be removed from the region of the locking element 24.

The adjustment of the force transmission element 21 in the unloading direction L is effected against the pretensioning effect of the spring element 218. After completed actuation, the force transmission element 21 is automatically moved back in the force direction F by an adjustment path so that the force transmission element 21 is spring-biased in the direction of its closed position.

The idea underlying the solution is not limited to the exemplary embodiments described above, but can also be realized in an entirely different way.

A closure device as described can serve to connect entirely different assemblies to each other.

The force transmission element is not necessarily to be subjected to a tensile load, but for example can also be subjected to pressure, wherein in this case the force transmission element is to be configured pressure-resistant.

The locking element can have a U-shaped design, which however is not absolutely necessary. The locking element for example can also be formed by an individual locking portion, which for example is elastically spring-biased with respect to a housing of the associated closure part.

The actuating direction of the actuating element can be directed perpendicularly to a force direction along which the force transmission element is to be loaded, which however is not absolutely necessary. The actuating direction can also be directed obliquely or collinearly to the force direction.

LIST OF REFERENCE NUMERALS

1 closure device
2 closure part
20 housing
200, 201 housing part
202 opening
203 opening
204 opening
205, 206 guide portion
21 force transmission element (traction element)
210 handle
211 acting portion (loop)
212 cutout
213, 214 protrusion
215 recess
216 run-up slope
217 shock-diminishing portion
218 spring element
22 magnetic element
23 actuating element
230 portion
231 actuating portion
232 inclined surface
24 locking element
240 bottom
241 locking portion
242 engagement opening
243 elasticity portion
244, 245 leg
246 rope groove
3 closure part
30 base
300 belt attachment
31 engagement element
310 locking protrusion
32 magnetic element
4 useful assembly (tool)
5 assembly
6 belt
A spreading direction
B actuating direction
E locking direction
F force direction
L unloading direction
N user
X closing direction

The invention claimed is:

1. A closure device, comprising
a first closure part that includes a locking element, a force transmission element operatively connected to the locking element, which can be loaded along a force direction, and an actuating element movable relative to the locking element, and
a second closure part that includes an engagement element, wherein the locking element and the engagement element can be attached to each other for connecting the first closure part and the second closure part to each other and are connected to each other in a closed position,
wherein in the closed position, when the force transmission element loaded along the force direction, the locking element is loaded in a locking direction towards contact with the engagement element by an action of force of the force transmission element,
wherein the actuating element can be actuated in order to adjust the locking element against the locking direction for releasing a connection between the locking element and the engagement element, and
wherein the first closure part includes a first magnetic element and the second closure part includes a second magnetic element, and wherein the first magnetic element and the second magnetic element cooperate in a magnetically attracting way when the locking element and the engagement element are attached to each other.

2. The closure device according to claim 1, wherein the force transmission element is formed by a traction element that can be subjected to a tensile load.

3. The closure device according to claim 2, wherein the force transmission element is configured flexurally slack for transmitting exclusively tensile forces.

4. The closure device according to claim 1, wherein the force transmission element includes an acting portion which at least sectionally is circumferentially extended around the locking element.

5. The closure device according to claim 4, wherein the acting portion is formed by a loop.

6. The closure device according to claim 1, wherein the first closure part has a housing relative to which the locking element is elastically adjustable.

7. The closure device according to claim 6, wherein the actuating element is force-loaded relative to the housing in the direction of a non-actuated position.

8. The closure device according to claim 1, wherein the first magnetic element is arranged on the actuating element and is movable together with the actuating element on actuation of the actuating element.

9. The closure device according to claim 1, wherein the locking element includes an elastically deformable elasticity portion and at least one leg arranged on the elasticity portion, which can be brought in contact with the engagement element.

10. The closure device according to claim 9, wherein the force transmission element is operatively connected to the at least one leg for loading the at least one leg in the locking direction.

11. The closure device according to claim 9, wherein the at least one leg includes a rope groove for receiving the force transmission element.

12. The closure device according to claim 9, wherein the actuating element includes an actuating portion which on actuation of the actuating element acts on the at least one leg in order to adjust the at least one leg against the locking direction for releasing the connection between the locking element and the engagement element.

13. The closure device according to claim 1, wherein the actuating element can be actuated along an actuating direction that is directed perpendicularly to the locking direction.

14. The closure device according to claim 1, wherein the locking element includes a locking portion which in the closed position positively is in engagement with the engagement element.

15. A system, comprising a useful assembly and a closure device according to claim 1, wherein the useful assembly is connected to the force transmission element.

16. A system, comprising a useful assembly and a closure device, which includes a first closure part with a force transmission element loadable along a force direction, which is connected to the useful assembly, and a first magnetic element, and a second closure part with a second magnetic element, wherein the first closure part and the second closure part can be attached to each other, are connected to each other in a closed position and can be released from each other for opening the closure device, wherein the first magnetic element and the second magnetic element cooperate in a magnetically attracting way when the first closure part and the second closure part are attached to each other, and wherein the force transmission element includes a shock-diminishing portion deformable on action of a load on the force transmission element.

* * * * *